: US 9,417,352 B2
(45) Date of Patent: Aug. 16, 2016

(54) MULTI-FREQUENCY INVERSION OF MODAL DISPERSIONS FOR ESTIMATING FORMATION ANISOTROPY CONSTANTS

(71) Applicant: Schlumberger Technology Corporation, Sugar Land, TX (US)

(72) Inventor: Bikash K. Sinha, Cambridge, MA (US)

(73) Assignee: Schlumberger Technology Corporation, Sugar Land, TX (US)

(*) Notice: Subject to any disclaimer, the term of this patent is extended or adjusted under 35 U.S.C. 154(b) by 427 days.

(21) Appl. No.: 13/916,542

(22) Filed: Jun. 12, 2013

(65) Prior Publication Data

US 2014/0369165 A1    Dec. 18, 2014

(51) Int. Cl.
G01V 1/50    (2006.01)

(52) U.S. Cl.
CPC .......... *G01V 1/50* (2013.01); *G01V 2210/6242* (2013.01)

(58) Field of Classification Search
CPC .............. G01V 2210/582; G01V 1/50; G01V 2210/6242
See application file for complete search history.

(56) References Cited

U.S. PATENT DOCUMENTS 4,703,460 A * 10/1987 Kurkjian et al. ............... 367/31
7,755,972 B2 * 7/2010 Yogeswaren et al. .......... 367/31

2003/0167835 A1    9/2003  Sinha et al.
2011/0170372 A1    7/2011  Horne et al.
2012/0026831 A1    2/2012  Mickael

OTHER PUBLICATIONS

Zhao et al., "Dispersion Curves and Dispersion Characteristic Expected from Different Borehole Environments", The Journal of Engineering Geology, Sep. 2007, vol. 17, No. 3, pp. 329-337.
International search report and written opinion for the equivalent PCT patent application No. PCT/US2014/042067 dated Oct. 8, 2014.
B.K. Sinha, A.N. Norris, S.K. Chang, "Borehole Flexural Modes in Anisotropic Formations," Geophysics, vol. 59, No. 7, pp. 1037-1052, Jul. 1994.
B.K. Sinha, "Sensitivity and inversion of borehole flexural dispersion for formation parameters," Geophysical Journal International, pp. 84-96, 1997.
M.P. Ekstrom, "Dispersion estimation from borehole acoustic arrays using a modified matrix pencil algorithm," 29th Asilomar Conference on Signals, System and Computers, Pacific Grove, CA, Oct. 31, 1995.

* cited by examiner

*Primary Examiner* — Luke Ratcliffe
*Assistant Examiner* — Hovhannes Baghdasaryan
(74) *Attorney, Agent, or Firm* — Jody Lynn DeStefani; Daryl R. Wright

(57) ABSTRACT

Systems and methods for the estimating a plurality of anisotropic elastic constants ($C_{ij}$) using borehole dispersions and refracted compressional headwave velocity at a single logging depth in a vertical, deviated, or horizontal wellbore in a transversely-isotropic with a vertical axis of symmetry ("TIV") formation. The estimated elastic constants can then be used to calculate near-wellbore stress distributions in the wellbore, which aids in an optimal completion design, such as for shale-gas production in the presence of shale heterogeneity.

20 Claims, 8 Drawing Sheets

MULTI-FREQUENCY INVERSION OF MODAL DISPERSIONS FOR ESTIMATING FORMATION ANISOTROPY CONSTANTS

BACKGROUND

An acoustic source in a fluid-filled borehole generates headwaves as well as relatively stronger borehole-guided modes. A standard sonic measurement system consists of placing a piezoelectric source and an array of hydrophone receivers inside a fluid-filled borehole. The piezoelectric source is configured in the form of either a monopole or a dipole source. The source bandwidth typically ranges from a 0.5 to 20 kHz. A monopole source generates primarily the lowest-order axi-symmetric mode, also referred to as the Stoneley mode, together with compressional and shear headwaves. In contrast, a dipole source primarily excites the lowest-order flexural borehole mode together with compressional and shear headwaves. The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle $\theta_i = \sin^{-1}(V_f/V_c)$, where $V_f$ is the compressional wave speed in the borehole fluid and $V_c$ is the compressional wave speed in the formation. As the compressional headwave travels along the interface, it radiates energy back into the fluid that can be detected by hydrophone receivers placed in the fluid-filled borehole.

In fast formations, the shear headwave can be similarly excited by a compressional wave at the critical incidence angle $\theta_i = \sin^{-1}(V_f/V_s)$, where $V_s$ is the shear wave speed in the formation. It is also worth noting that headwaves are excited only when the wavelength of the incident wave is smaller than the borehole diameter so that the boundary can be effectively treated as a planar interface. In a homogeneous and isotropic model of fast formations, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are standard processing techniques for the estimation of formation shear velocities in either fast or slow formations from an array of recorded dipole waveforms.

Recorded waveforms at an array of hydrophone receivers placed in a fluid-filled borehole can be processed by a modified matrix pencil algorithm to isolate both non-dispersive and dispersive arrivals in the wavetrain. Both the lowest-order axi-symmetric Stoneley and flexural modes are dispersive, i.e., velocity changes as a function of frequency. It should be understood that three of the five independent anisotropic elastic constants can be obtained from the cross-dipole acoustic data and Stoneley data according to techniques known in the art. For example, in a vertical wellbore (e.g., parallel to $X_3$-axis in FIG. 1), anisotropic elastic constants $C_{44}$ and $C_{55}$ can be estimated from the low-frequency asymptotes of cross-dipole acoustic data measured in the vertical wellbore, and anisotropic elastic constant $C_{66}$ can be estimated from the Stoneley data measured in the vertical wellbore. In a horizontal wellbore (e.g., parallel to $X_1$-axis in FIG. 1), anisotropic elastic constants $C_{66}$ and $C_{55}$ can be estimated from the low-frequency asymptotes of cross-dipole acoustic data measured in the horizontal wellbore, and anisotropic elastic constant $C_{44}$ can be estimated from the Stoneley data measured in the horizontal wellbore. Further, the refracted compressional headwaves yield an estimate of anisotropic elastic constant $C_{33}$ in a vertical wellbore and $C_{11}$ in a horizontal wellbore.

Under these circumstances, it becomes necessary to combine sonic data from both a horizontal and deviated wellbores to estimate all five independent anisotropic elastic constants. This procedure assumes that both the deviated and horizontal (or vertical) wellbore trajectories are in the same homogeneous anisotropic formation. While such an assumption may be appropriate for constructing anisotropic velocity models for seismic (AVO) interpretation, it may lead to unreliable estimate of variations in near-wellbore stresses that influence hydraulic fracture propagation to aid in the productivity of shale-gas. It is, therefore, desirable to estimate all five independent elastic constants from sonic data acquired as a function of logging depth in a horizontal wellbore in a shale gas play that exhibits significant heterogeneity along the wellbore.

SUMMARY

Systems and methods for the estimating a plurality of anisotropic elastic constants using borehole dispersions and refracted compressional headwave velocity at a single logging depth in a wellbore in a transversely-isotropic with a vertical axis of symmetry ("TIV") formation are provided herein. The estimated elastic constants can then be used to calculate near-wellbore stress distributions in the wellbore, which aids in an optimal completion design for shale-gas production in the presence of shale heterogeneity.

An example method for determining a plurality of anisotropic elastic constants for a transversely isotropic formation can include generating a broadband acoustic wave at an acoustic source and receiving data corresponding to an acoustic dispersion of the broadband acoustic wave at an acoustic receiver. The acoustic source and acoustic receiver can be located within a borehole in an open-hole or cased-hole logging environment. Additionally, the method can include calculating a frequency-dependent sensitivity of the acoustic dispersion to an incremental change in each of the anisotropic elastic constants. The method can also include sequentially inverting a difference between the acoustic dispersion and a reference acoustic dispersion to obtain each of the anisotropic elastic constants. Each inversion can be performed over a select bandwidth where the frequency-dependent sensitivity of the acoustic dispersion is adequate.

Optionally, the plurality of anisotropic constants can include one or more of $C_{11}$, $C_{33}$, $C_{55}$, $C_{66}$ and $C_{13}$. Optionally, the plurality of anisotropic constants can include greater than three of $C_{11}$, $C_{33}$, $C_{55}$, $C_{66}$ and $C_{13}$. Optionally, the plurality of anisotropic constants can include all five of $C_{11}$, $C_{33}$, $C_{55}$, $C_{66}$ and $C_{13}$ (i.e., all five independent transversely-isotropic ("TI") elastic constants). Alternatively or additionally, the data corresponding to the acoustic dispersion of the broadband acoustic wave can be recorded at an acoustic receiver at a single logging depth in a horizontal, vertical or deviated borehole.

Optionally, the frequency-dependent sensitivity of the acoustic dispersion to an incremental change in each of the anisotropic elastic constants, $C_{ij}\Delta V_k/V_k\Delta C_{ij}$, is at least greater than 1%, where $C_{ij}$ denotes an anisotropic elastic constant, where the indices i and j take values from 1 to 6 and $\Delta V_k$ represents a change in the modal phase velocity from a reference $V_k$, where the index k denotes a chosen frequency.

Alternatively or additionally, the frequency-dependent sensitivity of the acoustic dispersion to an incremental change in any of the anisotropic elastic constants is adequate when it is greater than approximately 1-3% or higher.

In the implementations discussed herein, the acoustic wave can be at least one of a dipole flexural wave, a Stoneley wave and a quadrupole wave. In addition, the acoustic dispersion can be at least one of a dipole flexural dispersion, a Stoneley dispersion and a quadrupole dispersion.

Optionally, the method can include sequentially inverting the difference between the acoustic dispersion and the reference acoustic dispersion to obtain an anisotropic elastic constant associated with a progressively decreasing frequency-dependent sensitivity of the acoustic dispersion. In other words, when performing the sequential inversion, an anisotropic constant associated with the greatest frequency-dependent sensitivity of the acoustic dispersion is obtained first. Then, the sequential inversion process continues by obtaining the anisotropic constant associated with the next greatest frequency-dependent sensitivity of the acoustic dispersion. Alternatively or additionally, the select bandwidth, e.g., the bandwidth over which the selective inversion is performed, can be determined for each of the anisotropic elastic constants.

Alternatively or additionally, a volumetric integral as a function of axial wavenumber or frequency can optionally be used to calculate the frequency-dependent sensitivity of the acoustic dispersion to an incremental change in each of the anisotropic elastic constants. Alternatively or additionally, a least-square minimization algorithm can optionally be used to sequentially invert a difference between the acoustic dispersion and the reference acoustic dispersion.

Optionally, the method can further include calculating a predicted acoustic dispersion after inverting for each of the anisotropic elastic constants. The predicted acoustic dispersion can be calculated using the anisotropic elastic constants obtained by inversion. Then, the method can optionally include determining a difference between the acoustic dispersion and the predicted acoustic dispersion. It should be understood that the acoustic dispersion is the measured acoustic dispersion, e.g., the acoustic dispersion represented by the data received at the acoustic receiver and corresponding to the acoustic dispersion of the broadband acoustic wave. If the difference between the acoustic dispersion and the predicted acoustic dispersion at a given frequency is greater than a predetermined amount, the method can include sequentially inverting the difference between the acoustic dispersion and the reference acoustic dispersion to obtain an anisotropic elastic constant associated with a progressively decreasing frequency-dependent sensitivity of the acoustic dispersion. Alternatively or additionally, if the difference between the acoustic dispersion and the predicted acoustic dispersion at the given frequency is less than the predetermined amount, the method can further include terminating the sequential inversion of the difference between the acoustic dispersion and the reference acoustic dispersion.

Optionally, the predetermined amount can be between approximately 0.1% and 0.2%.

Optionally, the reference acoustic dispersion can be an acoustic dispersion of an equivalent-isotropic and radially homogeneous ("EIH") formation. Alternatively or additionally, the method can optionally include estimating one or more anisotropic elastic constants from low-frequency data corresponding to the acoustic dispersion and generating the reference acoustic dispersion based on the estimated anisotropic elastic constants.

Alternatively or additionally, the acoustic dispersion can be a Stoneley dispersion, and estimating one or more anisotropic elastic constants from low-frequency data corresponding to the acoustic dispersion can include inverting the Stoneley dispersion between approximately 1 and 3 kHz to obtain anisotropic elastic constant $C_{66}$. Alternatively or additionally, the acoustic dispersion can be at least one of a dipole flexural dispersion, a Stoneley dispersion and a quadrupole dispersion, and estimating one or more anisotropic elastic constants from low-frequency data corresponding to the acoustic dispersion can include obtaining at least one of anisotropic elastic constants $C_{44}$ and $C_{55}$ from at least one of the dipole flexural dispersion, the Stoneley dispersion and the quadrupole dispersion.

Optionally, the method can further include estimating a minimum stress magnitude of the borehole using the anisotropic elastic constants obtained by inversion.

It should be understood that the above-described subject matter may also be implemented as a computer-controlled system or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
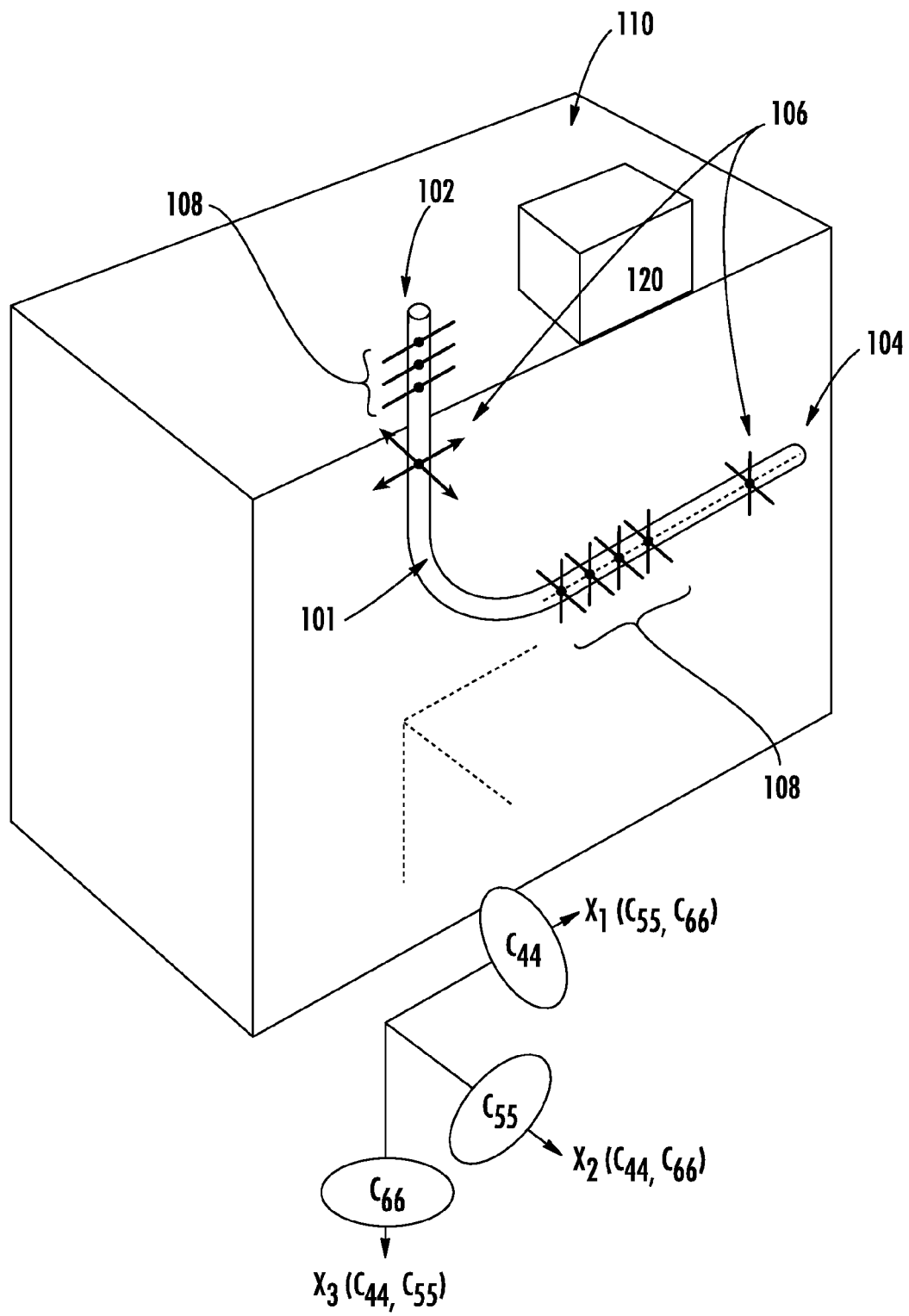
FIG. 1 is a schematic diagram of vertical and horizontal wellbore sections according to implementations discussed herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for performing a multi-frequency inversion of modal dispersions to determine one or more formation anisotropic elastic constants, it will become evident to those skilled in the art that the implementations are not limited thereto.

Elastic wave velocities estimated from borehole sonic data can be transformed into formation anisotropic elastic constants. For example, plane wave compressional and shear velocities can be obtained from the refracted compressional headwaves and low-frequency asymptotes of dipole flexural dispersions, respectively. The plane wave velocities can then be transformed into the corresponding anisotropic elastic constants. In related art, for the purposes of the transformation, it is assumed that the formation is homogeneous and that the radial depths of investigation of both the refracted compressional headwaves and low-frequency dipole signals are nearly the same. Additionally, to obtain a complete set of anisotropic elastic constants, the related-art techniques require plane wave velocities to be measured along multiple boreholes having different deviations. In contrast, according to the implementations discussed herein, a multi-frequency inversion algorithm is provided for inverting modal dispersions (e.g., Stoneley, dipole flexural or quadrupole dispersions) over a select bandwidth to determine one or more formation anisotropic elastic constants. Each of the anisotropic elastic constants optionally exhibits adequate sensitivity to the measured dispersive arrival. In addition, according to the implementations discussed herein, the one or more anisotropic elastic constants can be estimated from acoustic data recorded at a single logging depth in a horizontal, vertical or deviated borehole.

It should be understood that the modal dispersions can optionally include Stoneley, dipole flexural or quadrupole dispersions. The sensitivities of the modal dispersions to changes in the anisotropic elastic constants can vary significantly with wellbore (or borehole) deviation with respect to the TI-symmetry axis. For example, the borehole Stoneley, dipole flexural and quadrupole dispersions in a TI-formation, generally, exhibit frequency dependent sensitivities to all five independent anisotropic elastic constants (e.g., $C_{11}$, $C_{33}$, $C_{55}$, $C_{66}$ and $C_{13}$). In particular, the Stoneley dispersion in a vertical wellbore (e.g., parallel to the $X_3$-axis of FIG. 1) shows larger sensitivity to the shear modulus $C_{66}$ between 1 to 3 kHz, whereas at higher frequencies the Stoneley dispersion shows sensitivity to other anisotropic elastic constants (e.g., $C_{44}$). Additionally, the dipole flexural dispersions in horizontal wellbores (e.g., parallel to the $X_1$-axis in FIG. 1), for example in a VTI-shale formation, show varying sensitivities to all five independent anisotropic elastic constants.

A frequency-dependent integral formulation is provided that relates fractional changes in the modal wave velocities (e.g., Stoneley, flexural or quadrupole wave velocities) to incremental changes in anisotropic elastic constants from assumed elastic constants of an equivalent-isotropic formation. Consequently, fractional changes in the modal wave velocities at different frequencies can be inverted to obtain incremental changes in the anisotropic elastic constants from an equivalent-isotropic reference state. Based on the sensitivity of modal wave velocities to small changes in the anisotropic elastic constants, the inversion algorithm can be used to invert a plurality of anisotropic elastic constants from the measured borehole dispersions.

Optionally, according to the implementations discussed below, a sequential inversion is performed, where an inversion of the measured borehole dispersion over an appropriate bandwidth for the most-sensitive anisotropic elastic constant is performed followed by an inversion of a modified input (e.g., an input corrected for the estimated value of the most-sensitive anisotropic elastic constant) over an appropriate bandwidth for the next-most sensitive anisotropic elastic constant. This sequential inversion is continued until the final (e.g., the least-sensitive) anisotropic elastic constant is estimated. It should be understood that when the sensitivity of borehole dispersion to an anisotropic elastic constant is negligibly small, it is not possible to invert reliably for that particular anisotropic elastic constant. After each of the anisotropic elastic constants is estimated, a predicted borehole dispersion can be computed using the estimated anisotropic elastic constants, and a comparison of the predicted and measured borehole dispersion can be used to confirm consistency of the estimated anisotropic elastic constants and the measured borehole dispersion. Therefore, according to implementations discussed herein, it is possible to reliably invert a modal dispersion for more than one anisotropic elastic constant.

As discussed above, the implementations discussed herein enable a plurality of anisotropic elastic constants to be estimated from borehole sonic data. Optionally, it is possible to estimate all five independent anisotropic elastic constants using borehole sonic data collected in a single horizontal (or vertical or deviated) wellbore when there is adequate sensitivity of the measured modal dispersion to each of the five independent anisotropic elastic constants. For example, inversion of the fast and slow dipole dispersions in a horizontal wellbore together with the refracted compressional headwave velocity in a TIV-formation can yield good estimates of all five independent anisotropic elastic constants. Additionally, because the anisotropic elastic constants determined according to implementations discussed herein are not based on global averaging of formation properties from multiple wellbores, the estimates provide more reliable estimates of near-wellbore stresses using poroelastic or rock physics models for formation stresses in low porosity hard rocks.

Referring now to FIG. 1, a schematic diagram of horizontal and vertical wellbores 102, 104 in a formation 110 is shown. The formation 110 can contain a desirable fluid such as oil or gas. Additionally, the formation can be transversely-isotropic with a vertical axis of symmetry ("TIV") such as shale, for example. A TIV formation has physical properties that are isotropic in a plane perpendicular to the vertical TI-symmetry axis. The vertical wellbore 102 and/or the horizontal wellbore 104 can be drilled in the formation 110 in order to extract the fluid. The vertical wellbore 102 is parallel to the $X_3$-axis and the horizontal wellbore 104 is parallel to the $X_1$-axis. Although not shown in FIG. 1, a deviated wellbore can also be drilled in the formation 110. Optionally, the vertical wellbore 102 and the horizontal wellbore 104 can be fluid-filled wellbores, e.g., filled with a drilling fluid 101. Each of the vertical wellbore 102 and the horizontal wellbore 104 can optionally include one or more acoustic sources 106 and one or more acoustic receivers 108 arranged therein. This disclosure contemplates that each of the acoustic receivers 108 can be an acoustic array having a plurality of receivers. The acoustic sources 106 and the acoustic receivers 108 can be part of an acoustic logging tool of any type, including but not limited to, a wire line logging tool, a logging while drilling ("LWD") tool or a measurement while drilling ("MWD") tool. Logging tools are well known in the art and are therefore not discussed in further detail below.

The acoustic sources 106 can be configured to excite monopole, dipole or quadrupole acoustic modes. It should be understood that the acoustic sources 106 are configured to transmit energy (e.g., acoustic waves) into the formation 110. The energy can be characterized by its frequency and wavelength. Optionally, the acoustic sources 106 can transmit broadband energy at frequencies between 0.5 and 20 kHz, for example. The transmitted energy can excite compressional, shear, Stoneley, flexural and/or quadrupole waves in the formation 110. Additionally, the acoustic receivers 108 are configured to detect the compressional, shear, Stoneley, flexural or quadrupole waves travelling in the drilling fluid 101, for example. It should be understood that the energy transmitted by the acoustic sources 106 can be reflected and/or refracted from the fluid-formation interface. The acoustic receivers 108 can optionally include a plurality of receivers arranged in an acoustic array. By arranging the acoustic receivers 108 in an array with different spacing from the acoustic sources 106, it is possible to improve signal quality and extract various borehole signals over a broad frequency band. In addition, it should be understood that the vertical wellbore 102 and the horizontal wellbore 104, as well as the acoustic sources 106 and acoustic receivers 108, are provided only as examples and are not intended to be limiting.

The logging tool (e.g., the acoustic sources 106 and/or the acoustic receivers 108) can be operably connected with a control unit 120. It should be understood that the control unit 120 can optionally be located above, on and/or below the surface of the formation 110. Alternatively or additionally, the control unit 120 can be integrated with the logging tool and arranged in the vertical wellbore 102 and/or the horizontal wellbore 104. The control unit 120 can optionally be configured to control the acoustic sources 106 and/or the acoustic receivers 108, as well as receive, process and store acoustic data (e.g., the acoustic data detected, collect, recorded, etc. by the acoustic receivers 108). In its most basic configuration, the control unit 120 typically includes at least one processing unit and system memory. Depending on the exact configuration and type of control unit 120, system memory may be volatile (such as random access memory (RAM)), non-volatile (such as read-only memory (ROM), flash memory, etc.), or some combination of the two. The processing unit can be a standard programmable processor that performs arithmetic and logic operations necessary for operation of the control unit 120.

For example, the processing unit can be configured to execute program code encoded in tangible, computer-readable media. Computer-readable media refers to any media that is capable of providing data that causes the control unit 120 (i.e., a machine) to operate in a particular fashion. Various computer-readable media may be utilized to provide instructions to the processing unit for execution. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In addition, the control unit 120 can have additional features/functionality. For example, the control unit 120 may include additional storage such as removable storage and non-removable storage including, but not limited to, magnetic or optical disks or tapes. The control unit 120 may also contain network connection(s) that allow the device to communicate with other devices. The control unit 120 may also have input device(s) such as a keyboard, mouse, touch screen, etc. Output device(s) such as a display, speakers, printer, etc. may also be included. The additional devices may be connected to the bus in order to facilitate communication of data among the components of the control unit 120. All these devices are well known in the art and need not be discussed at length here.

Figure 2:
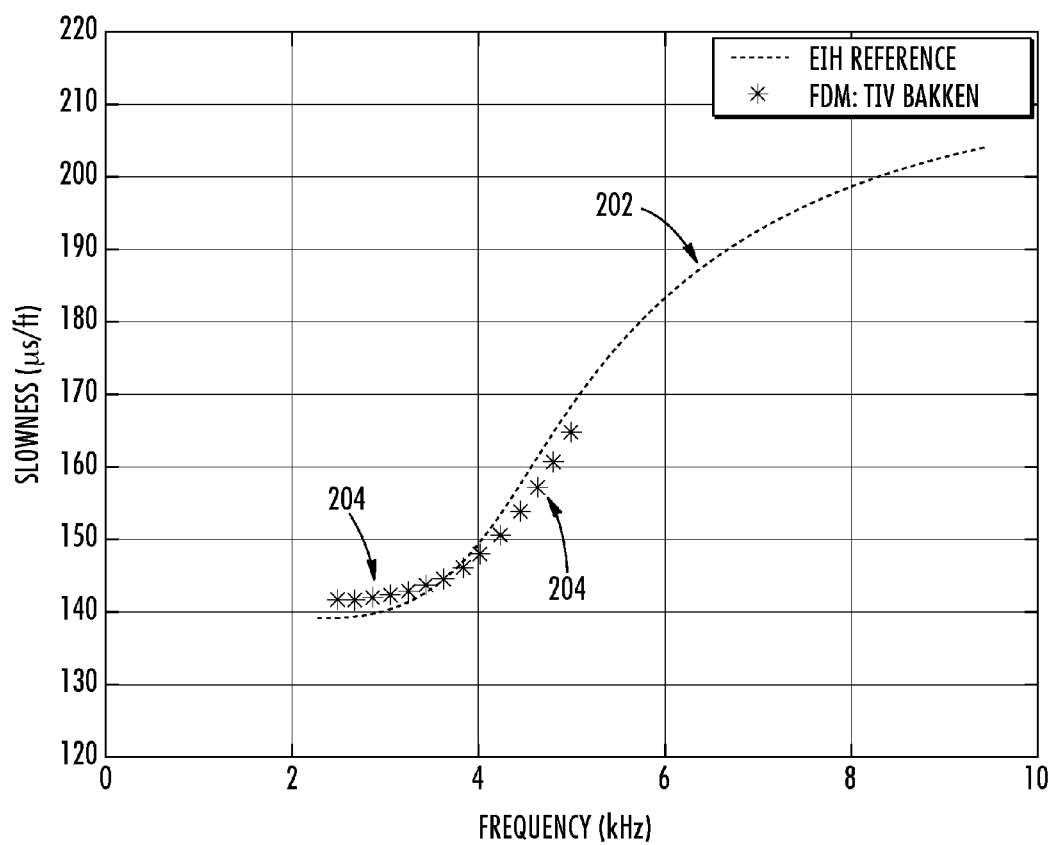
FIG. 2 is a graph illustrating an example dipole flexural dispersion of a chosen Equivalent-Isotropic and radially Homogeneous ("EIH") reference state and markers corresponding frequency points corresponding to an example measured (synthetic) slow dipole flexural dispersion.

In the implementations discussed herein, examples are provided where acoustic data acquired in the horizontal wellbore 104 (e.g., the wellbore parallel to the $X_1$-axis) such as cross-dipole acoustic data, for example, is analyzed. However, it should be understood that the implementations are equally applicable to acoustic data, including but not limited to, dipole flexural, Stoneley or quadrupole data, acquired in the vertical wellbore 102 or a deviated wellbore (e.g., a wellbore deviated at an angle other than 0 or 90 degrees). Referring now to FIG. 2, an example dipole flexural dispersion for the EIH formation (e.g., the reference state) is shown. Specifically, the reference dipole flexural dispersion for the EIH formation can be computed from a root-finding mode-search routine and is shown by curve 202. The following assumptions are made when computing the example dipole flexural dispersion for the reference state: a borehole of radius 10.8 cm filled with water having a mass density of 1000 kg/m3 and compressional velocity of 1500 m/s (compressional modulus 2.25 GPa) and an EIH formation with a mass density of 2230 kg/m3, compressional velocity of 3300 m/s and shear velocity of 2200 m/s. The corresponding compressional and shear moduli for the chosen EIH formation are 24.28 GPa and 10.79 GPa, respectively. A 3D-cylindrical finite-difference, time-domain formulation together with Perfectly-Matched Layer ("PML") can be used to calculate cross-dipole waveforms generated by a dipole transmitter oriented parallel to the $X_2$ and $X_3$-axes of FIG. 1 to obtain the fast and slow flexural waveforms propagating along the $X_1$-axis. Processing of an array of these waveforms using a modified matrix pencil algorithm yields the fast and slow dipole flexural dispersions. The two synthetic dispersions are assumed to be the dispersions measured by the acoustic receivers arranged in the wellbore, which are being inverted to obtain a plurality of anisotropic elastic constants at a given depth. Markers 204 denote slowness-frequency points from an example measured (synthetic) slow dipole flexural dispersion, e.g., measured using the acoustic receivers of FIG. 1, used in the multi-frequency inversion techniques discussed herein. The measured slow dipole flexural dispersion can be obtained from a finite-difference, time-domain method that accounts for the formation TIV anisotropy, for example. As shown in FIG. 2, the slowness-frequency points obtained from a finite-difference modeling code simulate measured data over a limited bandwidth of about 2 to 5 kHz.

Figure 3:
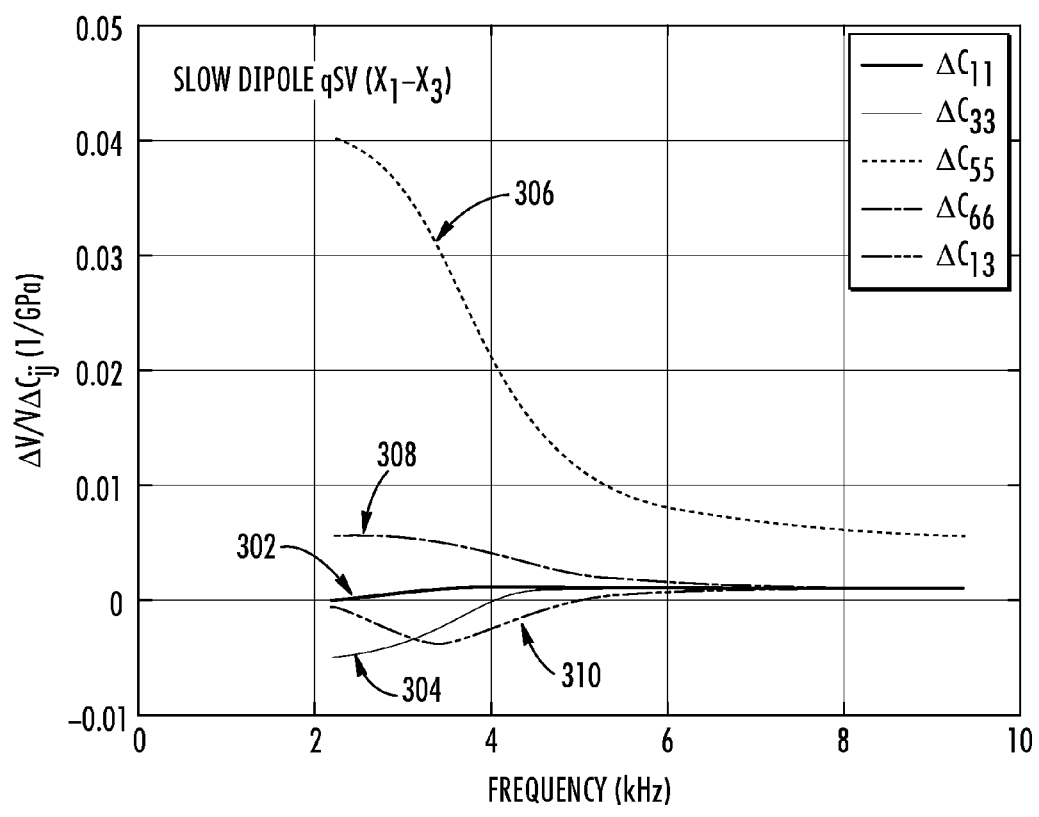
FIG. 3 is a graph illustrating frequency-dependent sensitivities of an example slow dipole flexural dispersion in a horizontal wellbore in a TIV formation to incremental changes in anisotropic elastic constants.

Referring now to FIG. 3, frequency-dependent sensitivities of an example slow dipole flexural dispersion in a horizontal wellbore in a TIV formation to incremental changes in anisotropic elastic constants are shown. The y-axis label $\Delta V/VC_{ij}$ (1/GPa) denotes fractional changes in the slow dipole flexural dispersion for 1 GPa change in the anisotropic elastic constant $C_{ij}$. Specifically, curves 302, 304, 306, 308 and 310 illustrate the frequency-dependent sensitivity of the example slow dipole flexural dispersion to an incremental change in anisotropic elastic constant $C_{11}$, $C_{33}$, $C_{55}$, $C_{66}$ and $C_{13}$, respectively. As discussed below, the frequency-dependent sensitivities of the example slow dipole flexural dispersion to an incremental change in each of the anisotropic elastic constants can be calculated using a volumetric integral as a function of axial wavenumber or frequency (e.g., Eqn. (23) below), for example. In particular, the six strain components can be obtained from the eigensolution of the flexural mode for the EIH formation. As shown in FIG. 3, the example slow dipole flexural dispersion exhibits largest sensitivity to changes in $C_{55}$ followed by changes in $C_{66}$ in the frequency band of 2 to 4 kHz. Additionally, the example slow dipole flexural dispersion exhibits some sensitivity to the elastic modulus $C_{33}$ as well in the frequency band of 2 to 3 kHz. Accordingly, as discussed in further detail below, the multi-frequency inversion algorithm optionally involves sequentially inverting for the anisotropic elastic constants associated with decreasing frequency-dependent sensitivities of the example slow dipole flexural dispersion. In other words, the example slow dipole flexural dispersion is optionally first inverted for $C_{55}$ in the select frequency band between approximately 2 and 4 kHz, followed by the inversion for $C_{66}$ in the select frequency band between approximately 2 and 4 kHz, followed by the inversion for $C_{33}$ in the select frequency band between approximately 2 and 3 kHz, etc.

Figure 4:
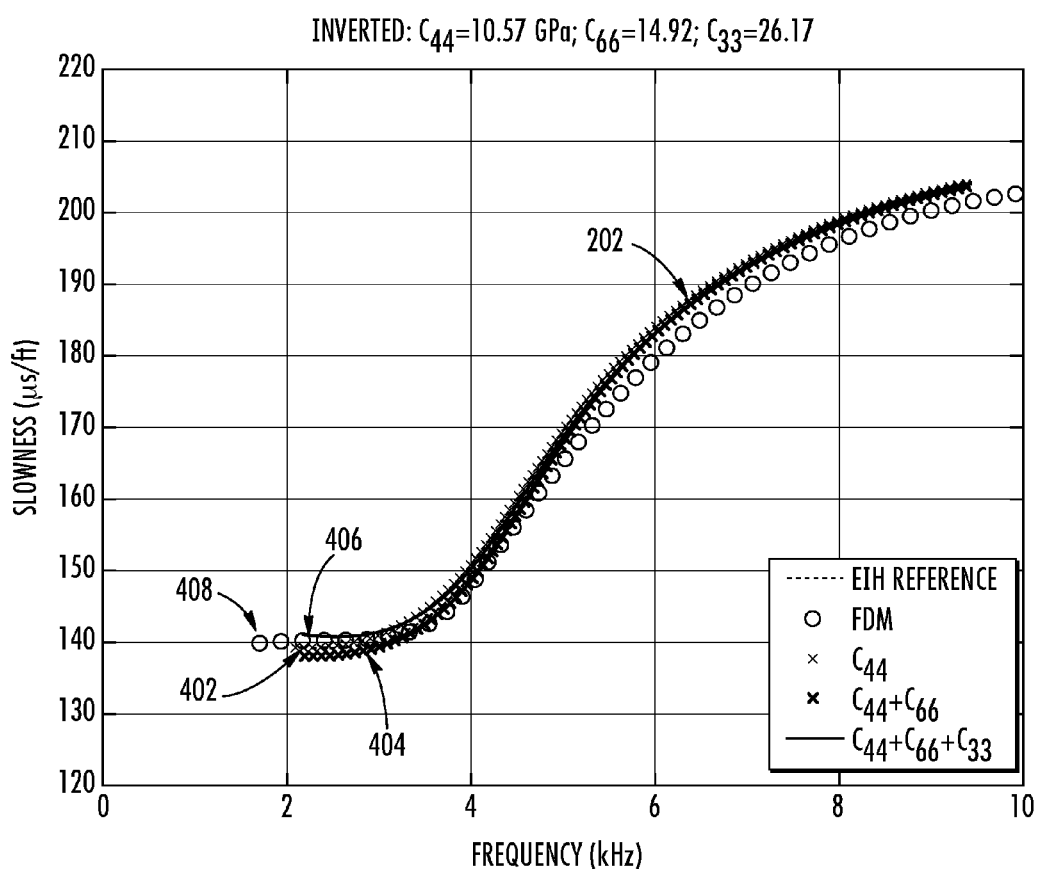
FIG. 4 is a graph illustrating several example computed slow dipole flexural dispersions with reference to the example measured slow dipole flexural dispersion and the example dipole flexural dispersion of the chosen EIH reference state shown in FIG. 2.

Referring now to FIG. 4, a graph illustrating several example computed slow dipole flexural dispersions 402, 404, 406 with reference to measured slow dipole flexural dispersion 408 and the example dipole flexural dispersion of the chosen EIH formation 202 of FIG. 2 is shown. As discussed above with regard to FIG. 3, the example dipole flexural dispersion exhibits progressively decreasing frequency-dependent sensitivity to incremental changes in anisotropic elastic constants $C_{55}$, $C_{66}$ and $C_{33}$, and the example dipole flexural dispersion is sequentially inverted for $C_{55}$, followed by the inversion for $C_{66}$, followed by the inversion for $C_{33}$. In FIG. 4, curve 402 illustrates a predicted slow dipole flexural dispersion computed using $C_{44}$ obtained by the inversion, curve 404 illustrates a predicted slow dipole flexural dispersion computed using $C_{44}$ and $C_{66}$ obtained by the inversions, and curve 406 illustrates a predicted slow dipole flexural dispersion computed using $C_{44}$, $C_{66}$ and $C_{33}$ obtained by the inversions. Curve 408 illustrates the measured slow dipole flexural dispersion, e.g., the slow dipole flexural dispersion measured using the acoustic receivers 108 of FIG. 1, for example.

As discussed in further detail below, following each inversion, a predicted dipole flexural dispersion can be computed using the estimated anisotropic elastic constants. The predicted dipole flexural dispersion can then be compared with the measured dipole flexural dispersion 308 to confirm the estimated anisotropic elastic constants. Additionally, if the difference between the predicted dipole flexural dispersion and the measured dipole flexural dispersion is less than a predetermined amount, it is not possible to invert for any additional anisotropic elastic constants because of the rather small sensitivity of the measured dipole flexural dispersion to changes in the elastic constants. In this case, the sequential inversion is terminated without inverting for additional anisotropic elastic constants. The predetermined amount can be between approximately 0.1% and 0.2%, for example.

Figure 5:
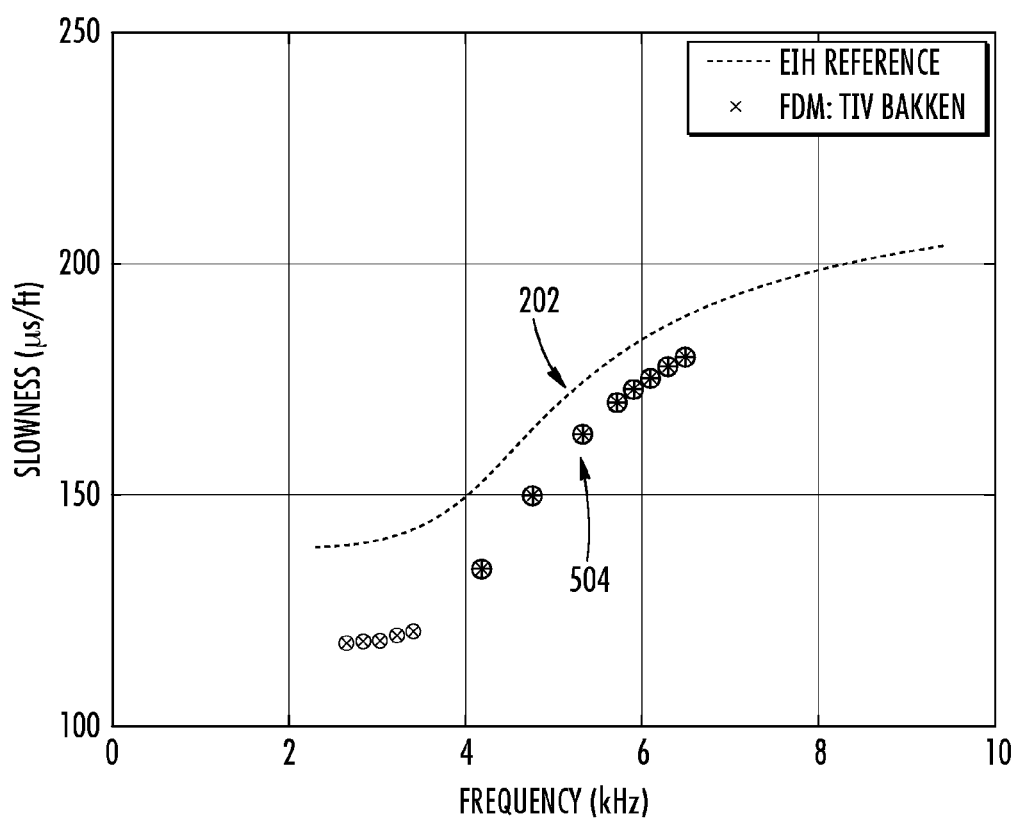
FIG. 5 is a graph illustrating an example dipole flexural dispersion of a chosen EIH reference state and markers corresponding frequency points corresponding to an example measured (synthetic) fast dipole flexural dispersion.

Referring now to FIG. 5, a graph illustrating an example dipole flexural dispersion of a chosen EIH reference state 202 and markers corresponding frequency points corresponding to an example measured (synthetic) fast dipole flexural dispersion 504 is shown. The example dipole flexural dispersion of the chosen reference state 202 is the same as shown in FIG. 2. Additionally, markers 504 denote fast-frequency points from an example measured (synthetic) fast dipole flexural dispersion, e.g., measured using the acoustic receivers of FIG. 1, used in the multi-frequency inversion techniques discussed herein. The measured fast dipole flexural dispersion can be obtained from a finite-difference, time-domain method that accounts for the formation TIV anisotropy, for example.

Figure 6:
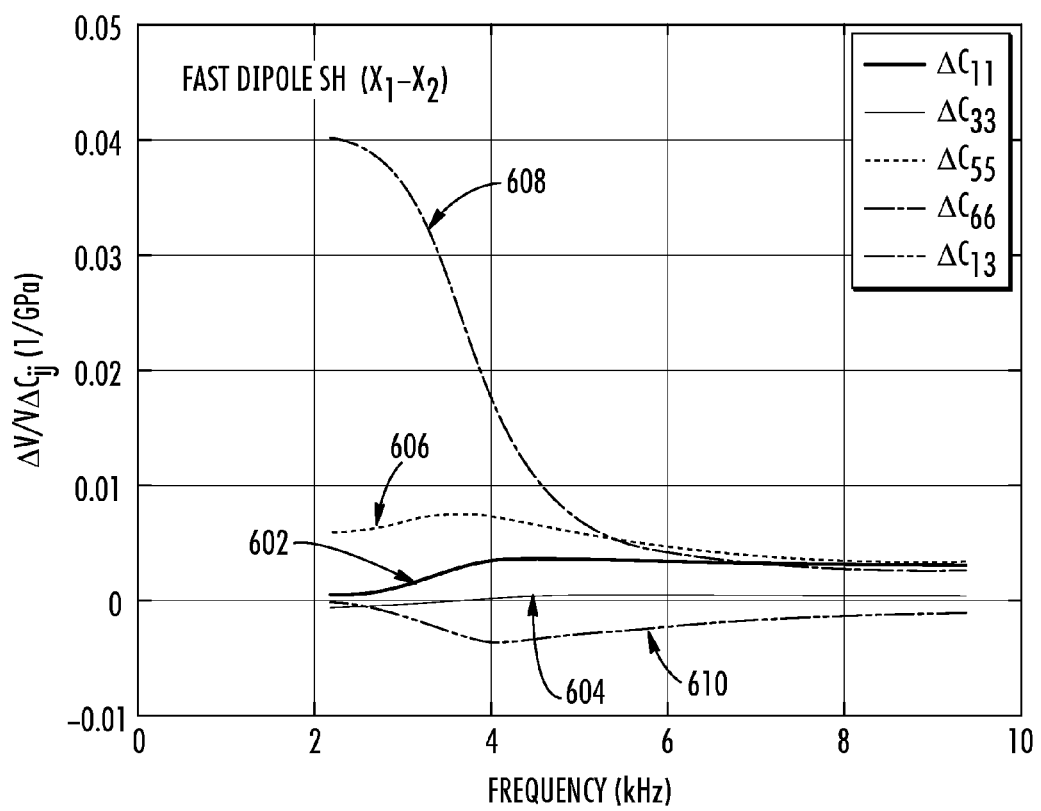
FIG. 6 is a graph illustrating frequency-dependent sensitivities of an example fast dipole flexural dispersion in a horizontal wellbore in a TIV formation to incremental changes in anisotropic elastic constants.

Referring now to FIG. 6, frequency-dependent sensitivities of an example fast dipole flexural dispersion in a horizontal wellbore in a TIV formation to incremental changes in anisotropic elastic constants are shown. The y-axis label $\Delta V/VC_{ij}$ (1/GPa) denotes fractional changes in the slow dipole flexural dispersion for 1 GPa change in the anisotropic elastic constant $C_{ij}$. Specifically, curves 602, 604, 606, 608 and 610 illustrate the frequency-dependent sensitivity of the example fast dipole flexural dispersion to an incremental change in anisotropic elastic constant $C_{11}$, $C_{33}$, $C_{55}$, $C_{66}$ and $C_{13}$, respectively. As discussed below, the frequency-dependent sensitivities of the example fast dipole flexural dispersion to an incremental change in each of the anisotropic elastic constants can be calculated using a volumetric integral as a function of axial wavenumber or frequency (e.g., Eqn. (23) below), for example. In particular, the six strain components can be obtained from the eigensolution of the flexural mode for the EIH formation. As shown in FIG. 6, the example fast dipole flexural dispersion exhibits largest sensitivity to changes in $C_{66}$ followed by changes in $C_{55}$ in the frequency band of 2 to 4 kHz. Additionally, the example fast dipole flexural dispersion exhibits some sensitivity to the elastic modulus $C_{13}$ as well in the frequency band of 3 to 6.5 kHz. Accordingly, as discussed in further detail below, the multi-frequency inversion algorithm optionally involves sequentially inverting for the anisotropic elastic constants associated with decreasing frequency-dependent sensitivities of the example fast dipole flexural dispersion. In other words, the example fast dipole flexural dispersion is optionally first inverted for $C_{66}$ in the select frequency band between approximately 2 and 4 kHz, followed by the inversion for $C_{55}$ in the select frequency band between approximately 2 and 4 kHz, followed by the inversion for $C_{13}$ in the select frequency band between approximately 3 and 6.5 kHz, etc.

Figure 7:
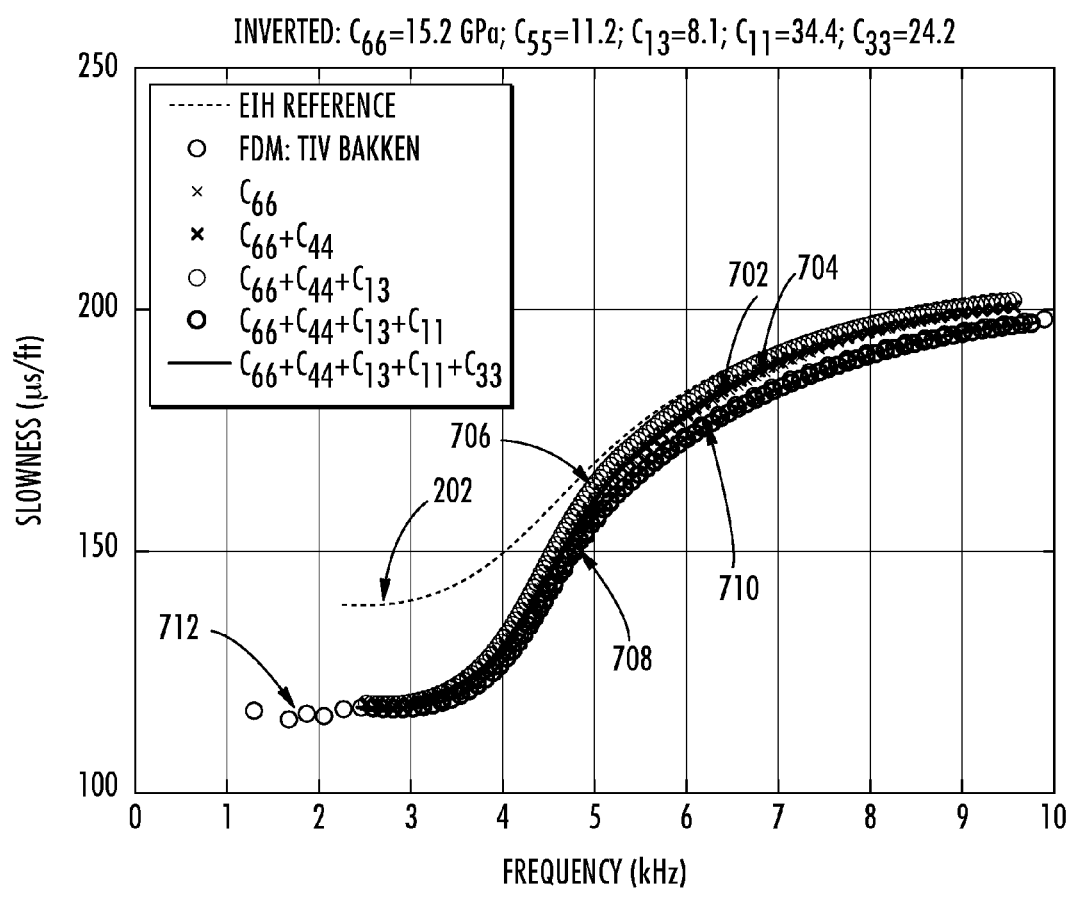
FIG. 7 is a graph illustrating several example computed fast dipole flexural dispersions with reference to the example measured fast dipole flexural dispersion and the example dipole flexural dispersion of the chosen EIH reference state shown in FIG. 5.

Referring now to FIG. 7, a graph illustrating several example computed fast dipole flexural dispersions 702, 704, 706, 708, 710 with reference to measured fast dipole flexural dispersion 712 and the example dipole flexural dispersion of the chosen EIH formation 202 of FIG. 2 is shown. As discussed above with regard to FIG. 6, the example dipole flexural dispersion exhibits progressively decreasing frequency-dependent sensitivity to incremental changes in anisotropic elastic constants $C_{66}$, $C_{55}$ and $C_{13}$. The example dipole flexural dispersion is sequentially inverted for $C_{66}$, followed by the inversion for $C_{44}$, followed by the inversion for $C_{13}$, followed by the inversion for $C_{11}$, followed by the inversion for $C_{33}$. In FIG. 7, curve 702 illustrates a predicted fast dipole flexural dispersion computed using $C_{66}$ obtained by the inversion, curve 704 illustrates a predicted fast dipole flexural dispersion computed using $C_{66}$ and $C_{44}$ obtained by the inversions, curve 706 illustrates a predicted fast dipole flexural dispersion computed using $C_{66}$, $C_{44}$ and $C_{13}$ obtained by the inversions, curve 708 illustrates a predicted fast dipole flexural dispersion computed using $C_{66}$, $C_{44}$, $C_{13}$ and $C_{11}$ obtained by the inversions and curve 710 illustrates a predicted fast dipole flexural dispersion computed using $C_{66}$, $C_{44}$, $C_{13}$, $C_{11}$ and $C_{33}$ obtained by the inversions. Curve 712 illustrates the measured fast dipole flexural dispersion, e.g., the dipole flexural dispersion measured using the acoustic receivers 108 of FIG. 1, for example.

As discussed above with regard to FIG. 4, following each inversion, a predicted dipole flexural dispersion can be computed using the estimated anisotropic elastic constants. The predicted dipole flexural dispersion can then be compared with the measured dipole flexural dispersion to confirm the estimated anisotropic elastic constants. Additionally, if the difference between the predicted dipole flexural dispersion and the measured dipole flexural dispersion is less than a predetermined amount, it is not possible to invert for any additional anisotropic elastic constants because of the rather small sensitivity of the measured dipole flexural dispersion to changes in the elastic constants. In this case, the sequential inversion is terminated without inverting for additional anisotropic elastic constants.

Fractional changes in the phase velocity of the borehole Stoneley, flexural or quadrupole modes caused by changes in the elastic constants (e.g., the anisotropic elastic constants discussed above) from a chosen reference state and mass density of the formation surrounding a fluid-filled borehole can be expressed in terms of the following volume integral at a given wavenumber:

$$\frac{\Delta V_k}{V_k^m} = \frac{\Delta \omega_k}{\omega_k^m} = \frac{\int_V \Delta C_{lmpq} u_{l,m}^m u_{p,q}^m \, dV}{2(\omega_k^m)^2 \int_V \rho_0 u_q^m u_q^m \, dV} - \frac{\int_V \Delta \rho u_q^m u_q^m \, dV}{2 \int_V \rho_0 u_q^m u_q^m \, dV}, \quad (1)$$

where $\Delta V_k/V_k^m$ and $\Delta \omega_k/\omega_k^m$, respectively, represent fractional changes in the phase velocity and angular frequency at a given wavenumber k; $\Delta C_{lmpq}$ and $\Delta \rho$, respectively, denote differences in the elastic constants and mass density of the surrounding formation from those assumed in the effective isotropic reference state. The effective isotropic reference state can be described by the two Lame constants $\lambda$ and $\mu$; and mass density $\rho_o$. The eigensolution for a chosen borehole mode m is denoted by the displacement $u_q^m$; $V_k^m$ and $\omega_k^m$ are the phase velocity and angular frequency at a given wavenumber k. The Cartesian tensor notation is used for the elastic constants, a convention where a comma followed by an index q implies partial derivative with respect to $x_q$ and a summation convention for repeated indices. The Cartesian tensor indices l, m, p, and q take values 1, 2, and 3.

To carry out the volume integral in cylindrical coordinates, all terms in the integrand are transformed from the Cartesian to cylindrical-polar coordinates so that the $\phi$-integration in the borehole cross-sectional plane can be carried out analytically. Since the formation is assumed to be axially homogeneous, it is straight-forward to integrate analytically over a wavelength along the propagation direction as well. The remaining r-integration is then carried out numerically. In the following description, the prefix $\Delta$ is omitted for the sake of brevity, i.e., $\Delta C_{ijkl} \rightarrow C_{ijkl}$. Next, the elastic constants are related in the rotated frame $C_{pq}'$ as a function of angle $\phi$ about the borehole axis.

The elastic constants $C_{pq}^{dev}$ referred to the deviated borehole axes can also be written in terms of elastic constants referred to the TI-anisotropy axes. Assume that the borehole is parallel to the $X_1$-axis and the borehole cross-sectional plane is parallel to the $X_2$-$X_3$ plane (e.g., the horizontal wellbore 104 shown in FIG. 1). Rotation of formation elastic constants by angle $\phi$ about the propagation direction $X_1$-axis can be expressed as:

$C_{11}' = C_{11}$, $C_{12}' = C_{12} \cos^2\phi + C_{13} \sin^2\phi + C_{14} \sin 2\phi$, $C_{13}' = C_{12} \sin^2\phi + C_{13} \cos^2\phi - C_{14} \sin 2\phi$, $C_{14}' = 0.5(C_{13} - C_{12})\sin 2\phi + C_{14} \cos 2\phi$, $C_{22}' = C_{22} \cos^4\phi + C_{33} \sin^4\phi + 2(C_{23} + 2C_{44})\cos^2\phi \sin^2\phi + 4C_{24} \cos^3\phi \sin\phi + 4C_{34} \cos\phi \sin^3\phi$, $C_{23}' = C_{23} \cos^4\phi + C_{23} \sin^4\phi + (C_{22} + C_{33} - 4C_{44})\cos^2\phi \sin^2\phi + 2(C_{34} - C_{24})\cos^3\phi \sin\phi + 2(C_{24} - C_{34})\cos\phi \sin^3\phi$, $C_{24}' = C_{24} \cos^4\phi - C_{34} \sin^4\phi + 3(C_{34} - C_{24})\cos^2\phi \sin^2\phi + (C_{23} - C_{22} + 2C_{44})\cos^3\phi \sin\phi + (C_{33} - C_{23} - 2C_{44})\cos\phi \sin^3\phi$, $C_{33}' = C_{33} \cos^4\phi + C_{22} \sin^4\phi + 2(C_{23} + 2C_{44})\cos^2\phi \sin^2\phi - 4C_{34} \cos^3\phi \sin\phi + 4C_{24} \cos\phi \sin^3\phi$, $C_{34}' = C_{34} \cos^4\phi - C_{24} \sin^4\phi + 3(C_{24} - C_{34})\cos^2\phi \sin^2\phi + (C_{33} - C_{23} - 2C_{44})\cos^3\phi \sin\phi + (C_{23} - C_{22} + 2C_{44})\cos\phi \sin^3\phi$, $C_{44}' = C_{44} \cos^4\phi + C_{44} \sin^4\phi + (C_{22} + C_{33} - 2C_{23} - 2C_{44})\cos^2\phi \sin^2\phi + 2(C_{34} - C_{24})\cos^3\phi \sin\phi + 2(C_{24} - C_{34})\cos\phi \sin^3\phi$, $C_{55}' = C_{55} \cos^2\phi + C_{66} \sin^2\phi - C_{56} \sin 2\phi$, $C_{56}' = C_{56} \cos^2\phi - C_{56} \sin^2\phi - (C_{55} - C_{66})\cos\phi \sin\phi$, $C_{66}' = C_{66} \cos^2\phi + C_{55} \sin^2\phi + C_{56} \sin 2\phi$, $C_{15}' = C_{16}' = C_{25}' = C_{26}' = C_{35}' = C_{36}' = C_{45}' = C_{46}' = 0. \quad (2)$ The eigensolution for a borehole mode in the surrounding formation can be expressed as:

$$u_r = \left[\left\{\frac{n}{r}H_n^1(\alpha r) - \alpha H_{n+1}^1(\alpha r)\right\}A + ikH_{n+1}^1(\beta r)A_1 + \frac{n}{r}H_n^1(\beta r)A_3\right]\cos n\phi e^{i(kz-\omega t)}, \quad (3)$$

$$u_\phi = \left[-\frac{n}{r}H_n^1(\alpha r)A + ikH_{n+1}^1(\beta r)A_1 + \left\{-\frac{n}{r}H_n^1 + \beta H_{n+1}^1(\beta r)\right\}A_3\right]\sin n\phi e^{i(kz-\omega t)},$$

$$u_r = [ikH_n^1(\alpha r)A - \beta H_n^1(\beta r)A_1]\cos n\phi e^{i(kz-\omega t)},$$

where $$\alpha^2 = \frac{\omega^2}{V_1^2} - k^2, \beta^2 = \frac{\omega^2}{V_2^2} - k^2, \quad (4)$$

$V_1$ and $V_2$ are the compressional and shear wave velocities, respectively. $H_n^1(x)$ denotes the Hankel function of the first-kind for outgoing waves, consistent with the assumed time dependence of $\exp(-i\omega t)$, which is defined as:

$$H_n^1(x) = J_n(x) + iY_n(x), \quad (5)$$

and $J_n(x)$ and $Y_n(x)$ are the n-th order Bessel functions of the first and second kinds, respectively. The solution for the displacement field in the surrounding formation is then used to calculate displacement gradients or corresponding strains required to calculate the perturbation integral in Eqn. (1).

The cylindrical strains associated with a borehole mode can be calculated from the displacement solution in Eqn. (3). The $\phi$-dependence of the cylindrical strains associated with the borehole modal eigenfunctions can be expressed as:

$$\begin{bmatrix} \varepsilon_{zz} \\ \varepsilon_{rr} \\ \varepsilon_{\phi\phi} \\ 2\varepsilon_{r\phi} \\ 2\varepsilon_{\phi z} \\ 2\varepsilon_{rz} \end{bmatrix} = \begin{bmatrix} \cos n\phi & & & & & \\ & \cos n\phi & & & & \\ & & \cos n\phi & & & \\ & & & \sin n\phi & & \\ & & & & \sin n\phi & \\ & & & & & \cos n\phi \end{bmatrix} \begin{bmatrix} E_{zz}(r) \\ E_{rr}(r) \\ E_{\phi\phi}(r) \\ E_{r\phi}(r) \\ E_{\phi z}(r) \\ E_{rz}(r) \end{bmatrix} \quad (6)$$

$$\exp i(kz - \omega t),$$

where the parameter n=0, 1, and 2, for the axi-symmetric Stoneley, flexural, and quadrupole modes, respectively. Using a matrix notation and suppressing the propagation term $\exp[i(kz-\omega t)]$, Eqn. (6) can be re-written as:

$$\epsilon_p = T_{pq} E_q, \quad (7)$$

where the matrix T is a diagonal matrix, and indices p and q take values 1, 2, 3, ... 6, following the Voigt's compressed notation.

The integrand $$\varepsilon_p C'_{pq} \varepsilon_q = E^T [T \ C' \ T] E^*, \quad (8)$$

where $$T \ C' \ T = \begin{bmatrix} C'_{11}\cos^2 n\phi & C'_{12}\cos^2 n\phi & C'_{13}\cos^2 n\phi & C'_{14}\cos n\phi\sin n\phi & 0 & 0 \\ & C'_{22}\cos^2 n\phi & C'_{23}\cos^2 n\phi & C'_{24}\cos n\phi\sin n\phi & 0 & 0 \\ & & C'_{33}\cos^2 n\phi & C'_{34}\cos n\phi\sin n\phi & 0 & 0 \\ & & & C'_{44}\sin^2 n\phi & 0 & 0 \\ & & & & C'_{55}\sin^2 n\phi & C'_{56}\cos n\phi\sin n\phi \\ \text{symmetric} & & & & & C'_{66}\cos^2 n\phi \end{bmatrix},$$

and superscripts T and *, respectively, denote the transpose and complex conjugate.

The volumetric integral can now be expressed as:

$$\frac{1}{2\pi}\int_0^{2\pi} d\phi \int_a^\infty r\, dr\, \varepsilon_p C'_{pq} \varepsilon_q^* = \int_a^\infty r\, dr\, E_p^T(r) C''_{pq} E_q^*(r), \quad (9)$$

where $$C'' = \frac{1}{2\pi}\int_0^{2\pi} d\phi\, T(\phi) C'(\phi) T(\phi). \quad (10)$$

Explicit $\phi$-integrals can now be expressed as:

$$F_1^n = \frac{1}{2\pi}\int_0^{2\pi}\cos^2\phi\cos^2 n\phi\, d\phi = \frac{1}{4} + \frac{1}{4}\delta_{n0} + \frac{1}{8}\delta_{n1}, \quad (11)$$

$$F_2^n = \frac{1}{2\pi}\int_0^{2\pi}\sin^2\phi\cos^2 n\phi\, d\phi = \frac{1}{2} + \frac{1}{2}\delta_{n0} + F_1^n,$$

$$F_3^n = \frac{1}{2\pi}\int_0^{2\pi}\cos^2\phi\sin^2 n\phi\, d\phi = \frac{1}{2} - F_1^n,$$

$$F_4^n = \frac{1}{2\pi}\int_0^{2\pi}\sin^2\phi\sin^2 n\phi\, d\phi = F_1^n - \frac{1}{2}\delta_{n0},$$

$$F_5^n = \frac{1}{2\pi}\int_0^{2\pi}\cos\phi\sin\phi\cos n\phi\sin n\phi\, d\phi = \frac{1}{8}\delta_{n1},$$

and another set of integrals can be expressed as:

$$G_1^n = \frac{1}{2\pi}\int_0^{2\pi}\cos^4\phi\cos^2 n\phi\, d\phi = \frac{3}{16} + \frac{3}{16}\delta_{n0} + \frac{1}{8}\delta_{n1} + \frac{1}{32}\delta_{n2}, \quad (12)$$

$$G_2^n = \frac{1}{2\pi}\int_0^{2\pi}\sin^4\phi\cos^2 n\phi\, d\phi = G_1^n - \frac{1}{4}\delta_{n1},$$

$$G_3^n = \frac{1}{2\pi}\int_0^{2\pi}\cos^2\phi\sin^2\phi\cos^2 n\phi\, d\phi = F_1^n - G_1^n,$$

$$G_4^n = \frac{1}{2\pi}\int_0^{2\pi}\cos^4\phi\sin^2 n\phi\, d\phi = \frac{3}{8} - G_1^n,$$

$$G_5^n = \frac{1}{2\pi}\int_0^{2\pi}\sin^4\phi\sin^2 n\phi\, d\phi = \frac{3}{8} + \frac{1}{4}\delta_{n1} - G_1^n,$$

$$G_6^n = \frac{1}{2\pi}\int_0^{2\pi}\cos^2\phi\sin^2\phi\sin^2 n\phi\, d\phi = \frac{1}{16} - \frac{1}{16}\delta_{n0} + \frac{1}{32}\delta_{n2},$$

$$G_7^n = \frac{1}{2\pi}\int_0^{2\pi}\cos^3\phi\sin\phi\cos n\phi\sin n\phi\, d\phi = -\frac{1}{32}\delta_{n0} + \frac{1}{16}\delta_{n1} + \frac{1}{32}\delta_{n2},$$

$$G_8^n = \frac{1}{2\pi}\int_0^{2\pi}\cos\phi\sin^3\phi\cos n\phi\sin n\phi\, d\phi = \frac{1}{32}\delta_{n0} + \frac{1}{16}\delta_{n1} - \frac{1}{32}\delta_{n2}.$$

The $C_{pq}''$ can be expressed in terms of anisotropic elastic constants in the fixed reference frame as:

$$C_{11}'' = C_{11}^{dev}(\tfrac{1}{2} + \tfrac{1}{2}\delta_{n0}),$$

$$C_{12}'' = C_{12}^{dev} F_1^n + C_{13}^{dev} F_2^n,$$

$$C_{13}'' = C_{13}^{dev} F_1^n + C_{12}^{dev} F_2^n,$$

$$C_{14}'' = (C_{13}^{dev} - C_{12}^{dev}) F_5^n,$$

$$C_{22}'' = C_{22}^{dev} G_1^n + C_{33}^{dev} G_2^n + 2(C_{23}^{dev} + 2C_{44}^{dev}) G_3^n,$$

$C_{23}^{//} = C_{23}^{dev} G_1^n + C_{33}^{dev} G_2^n + (C_{22}^{dev} + C_{23}^{dev} - 4C_{44}^{dev}) G_3^n,$ $C_{24}^{//} = (C_{23}^{dev} - C_{22}^{dev} + 2C_{44}^{dev}) G_7^n + (C_{33}^{dev} - C_{23}^{dev} - 2C_{44}^{dev}) G_8^n,$ $C_{33}^{//} = C_{33}^{dev} G_1^n + C_{22}^{dev} G_2^n + 2(C_{23}^{dev} + 2C_{44}^{dev}) G_3^n,$ $C_{34}^{//} = (C_{33}^{dev} - C_{23}^{dev} - 2C_{44}^{dev}) G_7^n + (C_{23}^{dev} - C_{22}^{dev} + 2C_{44}^{dev}) G_8^n,$ $C_{44}^{//} = C_{44}^{dev}(G_4^n + G_5^n) + (C_{22}^{dev} + C_{33}^{dev} - 2C_{23}^{dev} - 2C_{44}^{dev}) G_6^n,$ $C_{55}^{//} = C_{55}^{dev} F_3^n + C_{66}^{dev} F_4^n,$ $C_{56}^{//} = (C_{55}^{dev} - C_{66}^{dev}) F_5^n,$ $C_{66}^{//} = C_{66}^{dev} F_1^n + C_{55}^{dev} F_2^n,$ $C_{15}^{//} = C_{16}^{//} = C_{25}^{//} = C_{26}^{//} = C_{35}^{//} = C_{36}^{//} = C_{45}^{//} = C_{46}^{//} = 0. \quad (13)$ The numerator of the perturbation integral can be expressed as:

$$\int_a^\infty r\, dr E_p^T(r) C_{pq}^{//} E_q^*(r) = A_1 C_{11}^{dev} + A_2 C_{22}^{dev} + A_3 C_{33}^{dev} + A_4 C_{12}^{dev} + A_5 C_{13}^{dev} + A_6 C_{23}^{dev} + A_7 C_{44}^{dev} + A_8 C_{55}^{dev} + A_9 C_{66}^{dev}, \quad (14)$$

where $$A_1 = G_1^n \int_a^\infty r\, dr \varepsilon_{rr}^* \varepsilon_{rr} + G_3^n \int_a^\infty r\, dr (\varepsilon_{\phi\phi}^* \varepsilon_{rr} + \varepsilon_{rr}^* \varepsilon_{\phi\phi}) - G_7^n \int_a^\infty r\, dr \varepsilon_{rz}^* \varepsilon_{rr} + G_2^n \int_a^\infty r\, dr \varepsilon_{\phi\phi}^* \varepsilon_{\phi\phi} + G_6^n \int_a^\infty r\, dr \varepsilon_{r\phi}^* \varepsilon_{r\phi} + G_8^n \int_a^\infty r\, dr \varepsilon_{rr}^* \varepsilon_{\phi\phi}, \quad (15)$$

$$A_2 = G_1^n \int_a^\infty r\, dr \varepsilon_{\phi\phi}^* \varepsilon_{\phi\phi} + G_3^n \int_a^\infty r\, dr (\varepsilon_{\phi\phi}^* \varepsilon_{rr} + \varepsilon_{rr}^* \varepsilon_{\phi\phi}) - G_7^n \int_a^\infty r\, dr \varepsilon_{r\phi}^* \varepsilon_{\phi\phi} + G_2^n \int_a^\infty r\, dr \varepsilon_{rr}^* \varepsilon_{rr} + G_6^n \int_a^\infty r\, dr \varepsilon_{r\phi}^* \varepsilon_{r\phi} + G_8^n \int_a^\infty r\, dr \varepsilon_{\phi\phi}^* \varepsilon_{rr}, \quad (16)$$

$$A_3 = \frac{1}{2} \int_a^\infty r\, dr \varepsilon_{zz}^* \varepsilon_{zz}, \quad (17)$$

$$A_4 = 2G_1^n \int_a^\infty r\, dr (\varepsilon_{\phi\phi}^* \varepsilon_{rr} + \varepsilon_{rr}^* \varepsilon_{\phi\phi}) + 2G_3^n \int_a^\infty r\, dr (\varepsilon_{rr}^* \varepsilon_{rr} + \varepsilon_{\phi\phi}^* \varepsilon_{\phi\phi}) + (G_7^n - G_8^n) \int_a^\infty r\, dr (\varepsilon_{r\phi}^* \varepsilon_{rr} - \varepsilon_{r\phi}^* \varepsilon_{\phi\phi}) - 2G_6^n \int_a^\infty r\, dr \varepsilon_{r\phi}^* \varepsilon_{r\phi}, \quad (18)$$

$$A_5 = F_1^n \int_a^\infty r\, dr (\varepsilon_{rr}^* \varepsilon_{zz} + \varepsilon_{zz}^* \varepsilon_{rr}) + F_2^n \int_a^\infty r\, dr (\varepsilon_{\phi\phi}^* \varepsilon_{zz} + \varepsilon_{zz}^* \varepsilon_{\phi\phi}) - F_5^n \int_a^\infty r\, dr \varepsilon_{r\phi}^* \varepsilon_{zz}, \quad (19)$$

$$A_6 = F_2^n \int_a^\infty r\, dr (\varepsilon_{rr}^* \varepsilon_{zz} + \varepsilon_{zz}^* \varepsilon_{rr}) + F_1^n \int_a^\infty r\, dr (\varepsilon_{\phi\phi}^* \varepsilon_{zz} + \varepsilon_{zz}^* \varepsilon_{\phi\phi}) + F_5^n \int_a^\infty r\, dr \varepsilon_{r\phi}^* \varepsilon_{zz}, \quad (20)$$

$$A_7 = F_2^n \int_a^\infty r\, dr \varepsilon_{zr}^* \varepsilon_{zr} + F_3^n \int_a^\infty r\, dr \varepsilon_{\phi z}^* \varepsilon_{\phi z} + F_5^n \int_a^\infty r\, dr \varepsilon_{zr}^* \varepsilon_{\phi z}, \quad (21)$$

$$A_8 = F_1^n \int_a^\infty r\, dr \varepsilon_{zr}^* \varepsilon_{zr} + F_4^n \int_a^\infty r\, dr \varepsilon_{\phi z}^* \varepsilon_{\phi z} - F_5^n \int_a^\infty r\, dr \varepsilon_{zr}^* \varepsilon_{\phi z}, \quad (22)$$

$$A_9 = 4G_3^n \int_a^\infty r\, dr (\varepsilon_{rr}^* \varepsilon_{rr} + \varepsilon_{\phi\phi}^* \varepsilon_{\phi\phi} - \varepsilon_{\phi\phi}^* \varepsilon_{rr} - \varepsilon_{rr}^* \varepsilon_{\phi\phi}) + 2(G_7^n - G_8^n) \int_a^\infty r\, dr (\varepsilon_{rz}^* \varepsilon_{rr} - \varepsilon_{r\phi}^* \varepsilon_{\phi\phi}) + (G_4^n + G_5^n - 2G_6^n) \int_a^\infty r\, dr \varepsilon_{r\phi}^* \varepsilon_{r\phi}, \quad (23)$$

Next, the elastic constants referred to the deviated wellbore axes can be expressed in terms of TI-elastic constants and wellbore deviation $\theta$ from the TI-symmetry axis as follows:

$$C_{11}^{dev} = C_{11}\cos^4\theta + C_{33}\sin^4\theta + C_{55}\sin^2 2\theta + 2C_{13}\sin^2\theta\cos^2\theta, \quad (24)$$

$$C_{22}^{dev} = C_{22},$$

$$C_{33}^{dev} = C_{33}\cos^4\theta + C_{11}\sin^4\theta + C_{55}\sin^2 2\theta + 2C_{13}\sin^2\theta\cos^2\theta,$$

$$C_{12}^{dev} = C_{12}\cos^2\theta + C_{23}\sin^2\theta,$$

$$C_{13}^{dev} = C_{11}\sin^2\theta\cos^2\theta + \frac{1}{4}[(C_{33} - 4C_{55})\sin^2 2\theta + C_{13}(3 + \cos 4\theta)],$$

$$C_{23}^{dev} = C_{23}\cos^2\theta + C_{12}\sin^2\theta,$$

$$C_{44}^{dev} = C_{44}\cos^2\theta + C_{66}\sin^2\theta,$$

$$C_{55}^{dev} = \frac{1}{8}[(2C_{11} - 4C_{13})\sin^2 2\theta + (4C_{55} - C_{33})\cos 4\theta + C_{33} + 4C_{55}],$$

$$C_{66}^{dev} = C_{66}\cos^2\theta + C_{44}\sin^2\theta,$$

$$C_{35}^{dev} = -\frac{1}{4}\sin 2\theta[C_{33} - 2C_{11}\sin^2\theta + (C_{33} - 2C_{13})\cos 2\theta],$$

Substitution of Eqns. (21) into (11) yields:

$$\int_a^\infty r\, dr E_p^T(r) C_{pq}^{//} E_q^*(r) = \left[A_1\cos^4\theta + A_4\sin^4\theta + A_5\sin^2\theta\cos^2\theta + \frac{1}{4}A_8\sin^2 2\theta\right] C_{11} + A_2 C_{22} + \left[A_1\sin^4\theta + A_3\cos^4\theta + \frac{1}{4}A_5\sin^2 2\theta - \frac{1}{8}A_8\cos 4\theta\right] C_{33} + [A_7\cos^2\theta + A_9\sin^2\theta] C_{44} + \left[A_1\sin^2 2\theta + A_3\sin^2 2\theta - A_5\sin^2 2\theta + \frac{1}{2}A_8(1+\cos 4\theta)\right] C_{55} + [A_7\sin^2\theta + A_9\cos^2\theta] C_{66} + [A_4\cos^2\theta + A_6\sin^2\theta] C_{12} + [A_4\sin^2\theta + A_6\cos^2\theta] C_{23} + \left[(A_1+A_3)2\sin^2\theta\cos^2\theta + A_5(3+\cos 4\theta) - \frac{1}{2}A_8\sin^2 2\theta\right] C_{13},$$

At a given wavenumber, the fractional changes in the Stoneley, flexural or quadrupole velocities from an effective isotropic reference dispersion can be expressed in terms of differences between the anisotropic state of the formation and chosen isotropic elastic constants in the reference state as:

$$\frac{\Delta V}{V} = S_{11}\Delta C_{11}^{//} + S_{33}\Delta C_{33}^{//} + S_{44}\Delta C_{44}^{//} + S_{66}\Delta C_{66}^{//} + S_{13}\Delta C_{13}^{//}, \quad (25)$$

$$S_{pq}(k_i) = \frac{\int_V E_p^m E_q^m dV}{2(\omega_{ki}^m)^2 \int_V \rho_0 u_j^m u_j^m dV} = \frac{\Delta V}{V \Delta C_{pq}^{//}}, \quad (26)$$

where $S_{pq}(k_i)$ denotes the sensitivity coefficients for the elastic constants $C_{pq}$, the indices p and q denote the compressed Voigt's notation and take on values 1, 2, 3, ... 6; and the strain $E_p^m$ is defined by:

$$E_p^m = E_{ij}^m = \frac{1}{2}(u_{i,j}^m + u_{j,i}^m),\quad(27)$$

and $u_j^m$ denotes the displacement associated with the eigensolution of a fluid-filled borehole surrounded by an effective isotropic and radially homogeneous formation. Note that $\Delta C_{pq}^{//}$ is expressed in terms of the elastic constants $C_{pq}^{dev}$ as shown above in Eqn. (13) after integrating the solution azimuthally over $\phi$. Differences between the elastic constants and chosen effective isotropic constants in the reference state are defined by:

$$\Delta C_{11}^{dev} = C_{11}^{dev} - (\lambda + 2\mu),$$

$$\Delta C_{33}^{dev} = C_{33}^{dev} - (\lambda + 2\mu),$$

$$\Delta C_{44}^{dev} = C_{44}^{dev} - \mu,$$

$$\Delta C_{66}^{dev} = C_{66}^{dev} - \mu,$$

$$\Delta C_{13}^{dev} = C_{13}^{dev} - \lambda.\quad(28)$$

Considering an orthorhombic formation, differences between the formation anisotropic constants and chosen effective isotropic constants in the reference state can be expressed as:

$$\Delta C_{11}^{dev} = C_{11}^{dev} - (\lambda + 2\mu),$$

$$\Delta C_{22}^{dev} = C_{22}^{dev} - (\lambda + 2\mu),$$

$$\Delta C_{33}^{dev} = C_{33}^{dev} - (\lambda + 2\mu),$$

$$\Delta C_{44}^{dev} = C_{44}^{dev} - \mu,$$

$$\Delta C_{55}^{dev} = C_{55}^{dev} - \mu,$$

$$\Delta C_{66}^{dev} = C_{66}^{dev} - \mu,$$

$$\Delta C_{12}^{dev} = C_{12}^{dev} - \lambda,$$

$$\Delta C_{13}^{dev} = C_{13}^{dev} - \lambda,$$

$$\Delta C_{23}^{dev} = C_{23}^{dev} - \lambda.\quad(29)$$

Normalized sensitivity coefficients take the form:

$$S_{pq}^n = \frac{\Delta V}{V}\left(\frac{C_{pq}^{ref}}{\Delta C_{pq}}\right),$$

Therefore, the actual velocity at a given wavenumber is given by:

$$V = V_{ref} + V_{ref}(S_{11}\Delta C_{11} + S_{33}\Delta C_{33} + S_{44}\Delta C_{44} + S_{66}\Delta C_{66} + S_{13}\Delta C_{13}),\quad(30)$$

The corresponding frequency f for the perturbed velocity V can be expressed as:

$$k = \frac{\omega^{ref}}{V^{ref}} = \frac{\omega}{V},\quad(31)$$

$$f = \frac{kV}{2\pi},$$

The multi-frequency inversion of borehole dispersions to determine a plurality of anisotropic elastic constants is discussed below. For example, it has been demonstrated that at a given wavenumber $k_i$ or equivalently, frequency $f_i$:

$$\frac{\Delta V_i}{V_i} = S_{11}^i\Delta C_{11} + S_{33}^i\Delta C_{33} + S_{44}^i\Delta C_{44} + S_{66}^i\Delta C_{66} + S_{13}^i\Delta C_{13},\quad(32)$$

where a minimum of five independent velocity-frequency data is needed to solve for the 5 independent anisotropic elastic constants, for example, using the following matrix equation:

$$\begin{bmatrix} S_{11}^1 & S_{33}^1 & S_{44}^1 & S_{66}^1 & S_{13}^1 \\ S_{11}^2 & S_{33}^2 & S_{44}^2 & S_{66}^2 & S_{13}^2 \\ S_{11}^3 & S_{33}^3 & S_{44}^3 & S_{66}^3 & S_{13}^3 \\ S_{11}^4 & S_{33}^4 & S_{44}^4 & S_{66}^4 & S_{13}^4 \\ S_{11}^5 & S_{33}^5 & S_{44}^5 & S_{66}^5 & S_{13}^5 \end{bmatrix} \begin{bmatrix} \Delta C_{11} \\ \Delta C_{33} \\ \Delta C_{44} \\ \Delta C_{66} \\ \Delta C_{13} \end{bmatrix} = \begin{bmatrix} \frac{\Delta V_1}{V_1} \\ \frac{\Delta V_2}{V_2} \\ \frac{\Delta V_3}{V_3} \\ \frac{\Delta V_4}{V_4} \\ \frac{\Delta V_5}{V_5} \end{bmatrix}.$$

It is possible to invert for all five elastic constants from a single modal dispersion when the frequency-dependent sensitivity of the modal dispersion to changes in each of the elastic constants is adequate. For example, the frequency-dependent sensitivity of the modal dispersion to any of these elastic constants is adequate when it is greater than approximately 1%. Alternatively or additionally, the frequency-dependent sensitivity of the modal dispersion is adequate when it is greater than approximately 1-3% or higher. As discussed above, for some modal dispersions, the frequency-dependent sensitivity of the modal dispersion to one or more of the elastic constants is too small, which can cause the inversion to be ill-conditioned for a band-limited dispersion. The magnitude and frequency dependence of sensitivity functions can provide useful guidelines to select appropriate bandwidths for possible inversion of one or more elastic constants. Additionally, it should be understood that a select bandwidth for which the frequency-dependent sensitivity of the modal dispersion to each of the elastic constants is adequate can be different for each of the elastic constants. Eqn. (32) can be re-written, where at a given wavenumber $k_i$ or equivalently, frequency $f_i$:

$$\frac{\Delta V_i}{V_i} = s_{ij}\Delta c_j,\quad(33)$$

where $\Delta c_1 = \Delta C_{11}$, $\Delta c_2 = \Delta C_{33}$, $\Delta c_3 = \Delta C_{44}$, $\Delta c_4 = \Delta C_{66}$, and $\Delta c_5 = \Delta C_{13}$; $s_{ij}$ denotes sensitivity to $\Delta c_j$ at wavenumber $k_i$; and j=1, 2, 3, 4, and 5 correspond to the five independent elastic constants. Assuming that there are i measured fractional velocity changes $\Delta V_i/V_i$ from a chosen reference state, the best estimate of elastic constants without any constraints for a Gaussian random process is given by:

$$\Delta c_j = \frac{s_{ji}}{(s_{ji}s_{ij})}\frac{\Delta V_i}{V_i}.\quad(34)$$

It is now possible to sequentially invert for each of the elastic constants. Optionally, it is possible to sequentially invert for each of the elastic constants associated with a sequentially decreasing frequency-dependent sensitivity of the modal dispersion. Assume the frequency-dependent sensitivity of the modal dispersion to changes in $C_{66}$ is larger than the frequency-dependent sensitivity of the modal dispersion to changes in any of the other elastic constants over a select bandwidth. The inversion of $C_{66}$ can therefore optionally be performed first.

$$\Delta c_4 = \Delta C_{66} = \frac{\sum_{i=1}^{n} s_{4i} \frac{\Delta V_i}{V_i}}{\sum_{i=1}^{n} (s_{4i})^2}, \quad (35)$$

where the index n denotes number of velocity-frequency data used in the inversion, and the inverted $C_{66}$ is then given by:

$$C_{66} = \mu + \Delta C_{66}. \quad (36)$$

Eqn. (32) can now be updated as follows:

$$\frac{\Delta V_i}{V_i} - s_{i4}\Delta c_4 = \frac{\Delta W_i}{W_i} = s_{i1}\Delta c_1 + s_{i2}\Delta c_2 + s_{i3}\Delta c_3 + s_{i5}\Delta c_5, \quad (37)$$

Assume the frequency-dependent sensitivity of the modal dispersion to changes in $C_{44}$ is larger than the frequency-dependent sensitivity of the modal dispersion to changes in the remaining elastic constants over a select bandwidth. The inversion of $C_{44}$ can therefore optionally be performed next after updating the input fractional velocity at a given wave-number by $\Delta W_i/W_i$:

$$\Delta c_3 = \Delta C_{44} = \frac{\sum_{i=1}^{n} s_{3i} \frac{\Delta W_i}{W_i}}{\sum_{i=1}^{n} (s_{3i})^2}, \quad (38)$$

and the inverted $C_{44}$ is then given by:

$$C_{44} = \mu + \Delta C_{44}. \quad (39)$$

Eqn. (34) can now be updated as follows:

$$\frac{\Delta V_i}{V_i} - s_{i4}\Delta c_4 - s_{i3}\Delta c_3 = \frac{\Delta X_i}{X_i} = s_{i1}\Delta c_1 + s_{i2}\Delta c_2 + s_{i5}\Delta c_5, \quad (40)$$

Assume the frequency-dependent sensitivity of the modal dispersion to changes in $C_{13}$ is larger than the frequency-dependent sensitivity of the modal dispersion to changes in the remaining elastic constants over a select bandwidth. The inversion of $C_{13}$ can therefore optionally be performed next after updating the input fractional velocity at a given wave-number by $\Delta X_i/X_i$:

$$\Delta c_5 (= \Delta C_{13}) = \frac{\sum_{i=1}^{n} s_{5i} \frac{\Delta X_i}{X_i}}{\sum_{i=1}^{n} (s_{5i})^2}, \quad (41)$$

and the inverted $C_{13}$ is then given by:

$$C_{13} = \lambda + \Delta C_{13}. \quad (42)$$

Eqn. (37) can now be updated as follows:

$$\frac{\Delta V_i}{V_i} - s_{i4}\Delta c_4 - s_{i3}\Delta c_3 - s_{i5}\Delta c_5 = \frac{\Delta Y_i}{Y_i} = s_{i1}\Delta c_1 + s_{i2}\Delta c_2, \quad (43)$$

Assume the frequency-dependent sensitivity of the modal dispersion to changes in $C_{11}$ is larger than the frequency-dependent sensitivity of the modal dispersion to changes in the remaining elastic constants over a select bandwidth. The inversion of $C_{11}$ can therefore optionally be performed next after updating the input fractional velocity at a given wave-number by $\Delta Y_i/Y_i$:

$$\Delta c_1 (= \Delta C_{11}) = \frac{\sum_{i=1}^{n} s_{1i} \frac{\Delta Y_i}{Y_i}}{\sum_{i=1}^{n} (s_{1i})^2}, \quad (44)$$

and the inverted $C_{11}$ is then given by:

$$C_{11} = \lambda + 2\mu + \Delta C_{11}. \quad (45)$$

Eqn. (40) can now be updated as follows:

$$\frac{\Delta V_i}{V_i} - s_{i4}\Delta c_4 - s_{i3}\Delta c_3 - s_{i5}\Delta c_5 - s_{i1}\Delta c_1 = \frac{\Delta Z_i}{Z_i} = s_{i2}\Delta c_2, \quad (46)$$

Assume the frequency-dependent sensitivity of the modal dispersion to changes in $C_{33}$ is smaller than the frequency-dependent sensitivity of the modal dispersion to changes in any of the other elastic constants over a select bandwidth. The inversion of $C_{33}$ can therefore optionally be performed last after updating the input fractional velocity at a given wave-number by $\Delta Z_i/Z_i$:

$$\Delta c_2 (= \Delta C_{33}) = \frac{\sum_{i=1}^{n} s_{2i} \frac{\Delta Z_i}{Z_i}}{\sum_{i=1}^{n} (s_{2i})^2}, \quad (47)$$

and the inverted $C_{33}$ is then given by $$C_{33} = \lambda + 2\mu + \Delta C_{33}. \quad (48)$$

As shown above, it is therefore possible to invert for all five independent elastic constants provided there are adequate sensitivities of the modal dispersion to each of the five elastic constants over select bandwidths. Additionally, it should be understood that the select bandwidth can be the same or different for each of the elastic constants. Alternatively or additionally, the iterative inversion of elastic constants can be continued until sensitivities of the remaining elastic constants are deemed to be too small for a reliable inversion. Optionally, the iterative process of estimating a plurality of elastic constants with progressively decreasing sensitivities can be terminated when differences between the predicted and measured dipole dispersions become negligibly small.

Upon determining the five independent elastic constants at a given logging depth, the elastic constants can be used to estimate the minimum horizontal stress magnitude using one of the two forms of poroelastic stress equations given below:

$$\sigma_h - \alpha_h P_p = \frac{E_h}{E_V} \frac{v_V}{1-v_h}(\sigma_V - \alpha_V P_p) + \frac{\varepsilon_h E_h}{(1-v_h^2)} + \frac{\varepsilon_H v_h E_h}{(1-v_h^2)}, \quad (49)$$

$$\sigma_h - \alpha_h P_p = \quad (50)$$
$$\frac{C_{13}}{C_{33}}(\sigma_V - \alpha_V P_p) + \left(C_{11} - \frac{C_{13}C_{13}}{C_{33}}\right)\varepsilon_h + \left(C_{12} - \frac{C_{13}C_{23}}{C_{33}}\right)\varepsilon_H,$$

where $\sigma_h$ is the minimum horizontal stress, $\alpha_h$ is the Biot coefficient for a poroelastic rock, $P_p$ is the pore pressure, $\varepsilon_h$ and $\varepsilon_H$ are the minimum and maximum tectonic strains that are obtained from a calibration experiment to match the prediction with a mini-frac (or extended leak-off test XLOT) test at the location of interest. The elastic constants can be transformed into vertical and horizontal Young's moduli ($E_V$ and $E_h$) and Poisson's ratios ($v_V$ and $v_h$) according to any method known in the related art.

As shown above, an example technique for the estimating a plurality of elastic constants (e.g., all five independent TI-elastic constants) using borehole dispersions and refracted compressional headwave velocity at a single logging depth in a horizontal wellbore in a TIV shale formation is provided. The estimated elastic constants can be used to calculate near-wellbore stress distributions in horizontal wellbores to help in an optimal completion design for shale-gas production in the presence of shale heterogeneity. This technique is based on a frequency-dependent integral formulation that relates fractional changes in flexural velocities to incremental changes in the TI-elastic constants from elastic constants for an assumed equivalent isotropic formation. Based on the sensitivity of modal velocities to changes in the TI-elastic constants at a given axial wavenumber or frequency, the inversion algorithm can successfully invert for a plurality of elastic constants from the measured cross-dipole dispersions. The iterative inversion algorithm inverts one of the dipole flexural dispersions for an elastic constant with the highest sensitivity over a select bandwidth followed by inversions for other elastic constants with progressively reduced sensitivity over a given bandwidth. The iterative process is terminated when the successive differences between the predicted (e.g., computed using the elastic constants previously obtained by the inversion) and measured dipole dispersions together with sensitivities of remaining elastic constants become negligibly small.

Inversion of a band-limited fast dipole dispersion (corresponding to the SH shear wave at low frequencies) yields estimates of the shear moduli $C_{66}$ and $C_{55}$ together with $C_{13}$. In contrast, inversion of a slow dipole dispersion (corresponding to the qSV shear wave at low frequencies) provides estimates of $C_{44}$ and $C_{66}$ together with compressional modulus $C_{33}$. When there are small differences between estimates of $C_{55}$, $C_{44}$, and $C_{66}$ obtained from the fast and slow dipole dispersions caused by small amount of azimuthal heterogeneity in the two opposite quadrants, it is possible to average the two values of $C_{66}$ and $C_{44}(=C_{55})$. The compressional modulus $C_{11}$ can be obtained from the refracted compressional headwave velocity in a wellbore parallel to the $X_1$-axis. Local estimates of all five TI-elastic constants averaged within the radial depth of investigation and axial extent of receivers can provide reliable estimates of near-wellbore stress distributions that can help in the design of perforation clusters to enhance effectiveness of hydraulic fracturing for increased productivity.

It should be appreciated that the logical operations described herein with respect to the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 8:
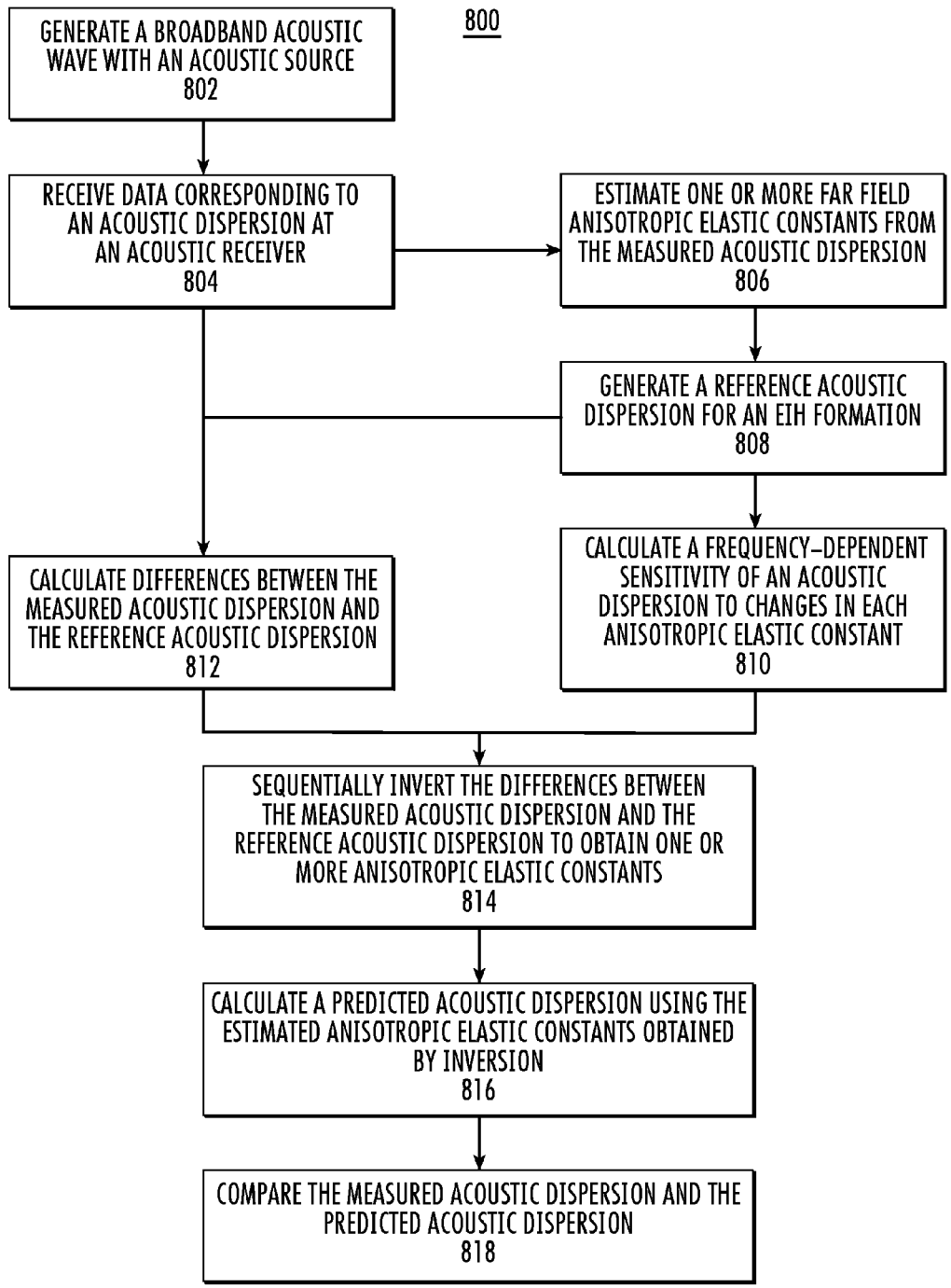
FIG. 8 is a flow diagram illustrating example operations for performing a multi-frequency inversion of a modal dispersion to determine one or more formation anisotropic elastic constants.

Referring now to FIG. 8, a flow diagram illustrating example operations 800 for performing a multi-frequency inversion of a modal dispersion to determine one or more formation anisotropic elastic constants is shown. At 802, a broadband acoustic wave is generated with an acoustic source. At 804, data corresponding to an acoustic dispersion (i.e., the measured acoustic dispersion) is received at an acoustic receiver. Optionally, the acoustic source and the acoustic receiver can optionally be the acoustic sources 106 and acoustic receivers 108 arranged in the horizontal wellbore 104 shown in FIG. 1, for example. Additionally, the broadband acoustic wave can optionally be at least one of a monopole, dipole and quadrupole acoustic wave, and the acoustic dispersion can optionally be at least one of a Stoneley, flexural dipole and quadrupole dispersion. After receiving the data corresponding to the acoustic dispersion, at 806, one or more far field anisotropic constants can be estimated from the measured acoustic dispersion. It should be understood that the far field anisotropic constants can be estimated using any technique known in the art. For example, when the measured acoustic dispersion is a Stoneley dispersion, it is possible to invert the Stoneley dispersion at low frequencies, e.g., between 1-3 kHZ, to obtain elastic constant $C_{66}$. Alternatively or additionally, when the measured acoustic dispersions are dipole flexural dispersions, it is possible to obtain either elastic constant $C_{44}$ or $C_{55}$ from the low-frequency asymptotes. Then, using the far field anisotropic constants, a reference acoustic dispersion for an EIH formation can be generated at 808.

At 810, a frequency-dependent sensitivity of an acoustic dispersion to an incremental change in each of a plurality of anisotropic elastic constants can be calculated. Optionally, the plurality of anisotropic constants can include one or more of $C_{11}$, $C_{33}$, $C_{55}$, $C_{66}$ and $C_{13}$. As discussed above, the frequency-dependent sensitivities can be calculated using a volumetric integral as a function of axial wavenumber or frequency. At 812, differences between the measured acoustic dispersion and the reference acoustic dispersion can be calculated. Then, at 814, the differences can be sequentially inverted to obtain one or more of the anisotropic elastic constants. As discussed above, the inversion is performed over a select bandwidth where the acoustic dispersion exhibits sensitivity to changes in the elastic constants. Optionally, the inversion can be accomplished using a least-squares minimization algorithm. Alternatively or additionally, the sequential inversion is performed to obtain anisotropic elastic constants associated with a progressively decreasing frequency-dependent sensitivity of the acoustic dispersion. In other words, when performing the sequential inversion, an anisotropic constants associated with the greatest frequency-dependent sensitivity of the acoustic dispersion is obtained first. Then, the sequential inversion process continues by obtaining the anisotropic constant associated with the next greatest frequency-dependent sensitivity of the acoustic dispersion.

Optionally, at 816, a predicted acoustic dispersion is calculated following each sequential inversion using the anisotropic elastic constants obtained by the inversion. Then, at 818, the measured acoustic dispersion and the predicted acoustic dispersion are compared. If the difference between the measured acoustic dispersion and the predicted acoustic dispersion at a given frequency is greater than a predetermined amount, the inversion process is continued to obtain an anisotropic elastic constant associated with a progressively decreasing frequency-dependent sensitivity of the acoustic dispersion. Alternatively or additionally, if the difference between the measured acoustic dispersion and the predicted acoustic dispersion at the given frequency is less than the predetermined amount, the inversion process is terminated. As discussed above, when the difference between the measured acoustic dispersion and the predicted acoustic dispersion is too small, the inversion may be ill-conditioned due to the rather small sensitivity to measured acoustic dispersion. Optionally, after estimating the plurality of anisotropic elastic constants through the inversion process, the minimum horizontal stress magnitude of the wellbore can be estimated.

EXAMPLES

Consider a TIV Bakken shale formation with a vertical axis of symmetry. Referred to the TI-axes with the $X_3$-parallel to the symmetry axis, the elastic constants for this formation are listed in Table 1 below.

TABLE 1

Material parameters for Bakken shale and borehole fluid

| Material | Mass density (kg/m$^3$) | $C_{11}$ (GPa) | $C_{33}$ (GPa) | $C_{13}$ (GPa) | $C_{44}$ (GPa) | $C_{66}$ (GPa) |
|---|---|---|---|---|---|---|
| Bakken shale | 2230 | 40.9 | 26.9 | 8.5 | 10.5 | 15.3 |
| Borehole fluid | 1000 | 2.25 | 2.25 | 2.25 | 0 | 0 |

Inversion of the slow dipole flexural dispersion in a horizontal wellbore in a TIV shale formation yields the TI-elastic constants $C_{44}$, $C_{66}$, and $C_{33}$. Note that $C_{44}=C_{55}$ in a TI-material. Table 2 below compares the inverted TI-constants obtained by the inversion process provided herein and actual TI-elastic constants.

TABLE 2

Comparison of actual and inverted TI-constants from the slow dipole flexural dispersion

| Parameter | $C_{55}$ (GPa) | $C_{66}$ (GPa) | $C_{33}$ (GPa) |
|---|---|---|---|
| Inverted | 10.57 | 14.92 | 26.17 |
| Actual | 10.5 | 15.3 | 26.9 |

TABLE 3

Comparison of actual and inverted TI-constants from the fast dipole flexural dispersion

| Parameter | $C_{66}$ (GPa) | $C_{55}$ (GPa) | $C_{13}$ (GPa) |
|---|---|---|---|
| Inverted | 15.2 | 11.2 | 8.1 |
| Actual | 15.3 | 10.5 | 8.5 |

Since the inverted values of $C_{55}$ and $C_{66}$ obtained from the slow dipole and fast dipole flexural dispersions are somewhat different, these values are averaged to represent the TI-constants for the formation. The $5^{th}$ TI-elastic constant $C_{11}$ can be obtained from the refracted compressional headwave velocity along the horizontal wellbore parallel to the $X_1$-axis of the TI-formation. Therefore, it is possible to obtain all 5 TI-elastic constants from the inversion of fast and slow dipole flexural dispersions and refracted compressional headwave velocity as a function of logging depth in a horizontal wellbore in a TIV-shale formation. These are effective TI-constants averaged over the formation volume probed by a sonic tool. The volume probed by the sonic tool is defined by the axial extent of receiver aperture and radial depth of investigation determined by the logging frequency for the borehole modes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for determining a plurality of anisotropic elastic constants, $C_{ij}$, for a transversely isotropic formation, comprising:
    locating an acoustic tool including an acoustic source and an acoustic receiver within a borehole surrounded by the transversely isotropic formation;
    generating a broadband acoustic wave at the acoustic source;
    receiving data corresponding to an acoustic dispersion of the broadband acoustic wave at the acoustic receiver;
    calculating a frequency-dependent sensitivity of the acoustic dispersion to an incremental change in each of the anisotropic elastic constants, $C_{ij}\Delta V_k/V_k\Delta C_{ij}$; and
    sequentially inverting a difference between the acoustic dispersion and a reference acoustic dispersion to obtain each of the anisotropic elastic constants, wherein each inversion is performed over a select bandwidth where the frequency-dependent sensitivity of the acoustic dispersion to an incremental change in each of the anisotropic elastic constants, $C_{ij}\Delta V_k/V_k\Delta C_{ij}$, is adequate, where $C_{ij}$ represents an anisotropic elastic constant, $V_k$ represents a reference modal phase velocity, $\Delta C_{ij}$ represents a change in an anisotropic elastic constant, $\Delta V_k$ represents a change in a modal phase velocity from the reference modal phase velocity $V_k$, and indices i and j can be integers 1-6 and index k is a chosen frequency.

2. The method of claim 1, wherein the acoustic wave is at least one of a dipole flexural wave, a Stoneley wave and a quadrupole wave, and wherein the acoustic dispersion is at least one of a dipole flexural dispersion, a Stoneley dispersion and a quadrupole dispersion.

3. The method of claim 1, wherein sequentially inverting a difference between the acoustic dispersion and a reference acoustic dispersion to obtain each of the anisotropic elastic constants further comprises sequentially inverting the difference between the acoustic dispersion and the reference acoustic dispersion to obtain an anisotropic elastic constant associated with a progressively decreasing frequency-dependent sensitivity of the acoustic dispersion, and wherein the select bandwidth is determined for each of the anisotropic elastic constants.

4. The method of claim 1, wherein calculating the frequency-dependent sensitivity of the acoustic dispersion to an incremental change in each of the anisotropic elastic constants comprises using a volumetric integral as a function of axial wavenumber or frequency.

5. The method of claim 1, wherein sequentially inverting a difference between the acoustic dispersion and the reference acoustic dispersion comprises using a least-square minimization algorithm.

6. The method of claim 1, further comprising:
calculating a predicted acoustic dispersion after inverting for each of the anisotropic elastic constants using the anisotropic elastic constants obtained by inversion;
determining a difference between the acoustic dispersion and the predicted acoustic dispersion;
if the difference between the acoustic dispersion and the predicted acoustic dispersion at a given frequency is greater than a predetermined amount, sequentially inverting the difference between the acoustic dispersion and the reference acoustic dispersion to obtain an anisotropic elastic constant associated with a progressively decreasing frequency-dependent sensitivity of the acoustic dispersion; and
if the difference between the acoustic dispersion and the predicted acoustic dispersion at the given frequency is less than the predetermined amount, terminating the sequential inversion of the difference between the acoustic dispersion and the reference acoustic dispersion.

7. The method of claim 1, wherein the reference acoustic dispersion is an acoustic dispersion of an equivalent-isotropic and radially homogeneous formation, and the method further comprises:
estimating one or more anisotropic elastic constants from low-frequency data corresponding to the acoustic dispersion; and
generating the reference acoustic dispersion based on the estimated anisotropic elastic constants.

8. The method of claim 7, wherein the acoustic dispersion comprises a Stoneley dispersion, and wherein estimating one or more anisotropic elastic constants from low-frequency data corresponding to the acoustic dispersion further comprises inverting the Stoneley dispersion between approximately 1 and 3 kHz to obtain anisotropic elastic constant $C_{66}$.

9. The method of claim 7, wherein the acoustic dispersion comprises at least one of a dipole flexural dispersion, a Stoneley dispersion and a quadrupole dispersion, and wherein estimating one or more anisotropic elastic constants from low-frequency data corresponding to the acoustic dispersion further comprises obtaining at least one of anisotropic elastic constants $C_{44}$ and $C_{55}$ from at least one of the dipole flexural dispersion, the Stoneley dispersion and the quadrupole dispersion.

10. The method of claim 1, further comprising estimating a minimum stress magnitude of the borehole using the anisotropic elastic constants obtained by inversion.

11. A system for determining a plurality of anisotropic elastic constants, $C_{ij}$, for a transversely isotropic formation, comprising:

an acoustic tool including an acoustic source and an acoustic receiver; and
a control unit comprising at least one processor and a memory, wherein the control unit is configured to:
generate a broadband acoustic wave;
receive data corresponding to an acoustic dispersion of the broadband acoustic wave;
calculate a frequency-dependent sensitivity of the acoustic dispersion to an incremental change in each of the anisotropic elastic constants, $C_{ij}\Delta V_k/V_k\Delta C_{ij}$; and
sequentially invert a difference between the acoustic dispersion and a reference acoustic dispersion to obtain each of the anisotropic elastic constants, wherein each inversion is performed over a select bandwidth where the frequency-dependent sensitivity of the acoustic dispersion to an incremental change in each of the anisotropic elastic constants, $C_{ij}\Delta V_k/V_k\Delta C_{ij}$, is adequate, where $C_{ij}$ represents an anisotropic elastic constant, $V_k$ represents a reference modal phase velocity, $\Delta C_{ij}$ represents a change in an anisotropic elastic constant, $\Delta V_k$ represents a change in a modal phase velocity from the reference modal phase velocity $V_k$, and indices i and j can be integers 1-6 and index k is a chosen frequency.

12. The system of claim 11, wherein the acoustic wave is at least one of a dipole flexural wave, a Stoneley wave and a quadrupole wave, and wherein the acoustic dispersion is at least one of a dipole flexural dispersion, a Stoneley dispersion and a quadrupole dispersion.

13. The system of claim 11, wherein the control unit is further configured to sequentially invert the difference between the acoustic dispersion and the reference acoustic dispersion to obtain an anisotropic elastic constant associated with a progressively decreasing frequency-dependent sensitivity of the acoustic dispersion, and wherein the select bandwidth is determined for each of the anisotropic elastic constants.

14. The system of claim 11, wherein the control unit is further configured to calculate the frequency-dependent sensitivity of the acoustic dispersion to an incremental change in each of the anisotropic elastic constants by using a volumetric integral as a function of axial wavenumber or frequency.

15. The system of claim 11, wherein the control unit is further configured to sequentially invert a difference between the acoustic dispersion and the reference acoustic dispersion using a least-square minimization algorithm.

16. The system of claim 11, wherein the control unit is further configured to:
calculate a predicted acoustic dispersion after inverting for each of the anisotropic elastic constants by using the anisotropic elastic constants obtained by inversion;
determine a difference between the acoustic dispersion and the predicted acoustic dispersion;
if the difference between the acoustic dispersion and the predicted acoustic dispersion at a given frequency is greater than a predetermined amount, sequentially invert the difference between the acoustic dispersion and the reference acoustic dispersion to obtain an anisotropic elastic constant associated with a progressively decreasing frequency-dependent sensitivity of the acoustic dispersion; and
if the difference between the acoustic dispersion and the predicted acoustic dispersion at the given frequency is less than the predetermined amount, terminate the sequential inversion of the difference between the acoustic dispersion and the reference acoustic dispersion.

17. The system of claim 11, wherein the reference acoustic dispersion is an acoustic dispersion of an equivalent-isotropic and radially homogeneous formation, and wherein the control unit is further configured to:
   estimate one or more anisotropic elastic constants from low-frequency data corresponding to the acoustic dispersion; and
   generate the reference acoustic dispersion based on the estimated anisotropic elastic constants.

18. The system of claim 17, wherein the acoustic dispersion comprises a Stoneley dispersion, and wherein estimating one or more anisotropic elastic constants from low-frequency data corresponding to the acoustic dispersion further comprises inverting the Stoneley dispersion between approximately 1 and 3 kHz to obtain anisotropic elastic constant $C_{66}$.

19. The system of claim 17, wherein the acoustic dispersion comprises at least one of a dipole flexural dispersion, a Stoneley dispersion and a quadrupole dispersion, and wherein estimating one or more anisotropic elastic constants from low-frequency data corresponding to the acoustic dispersion further comprises obtaining at least one of anisotropic elastic constants $C_{44}$ and $C_{55}$ from at least one of the dipole flexural dispersion, the Stoneley dispersion and the quadrupole dispersion.

20. The system of claim 11, wherein the control unit is further configured to estimate a minimum stress magnitude of the borehole using the anisotropic elastic constants obtained by inversion.

\* \* \* \* \*